(12) United States Patent
Emura et al.

(10) Patent No.: US 8,491,428 B2
(45) Date of Patent: Jul. 23, 2013

(54) BICYCLE STRUCTURE

(75) Inventors: Atsuhiro Emura, Osaka (JP); Yoshiaki Nankou, Osaka (JP)

(73) Assignee: Shimano Inc., Osaka (JP)

( * ) Notice: Subject to any disclaimer, the term of this patent is extended or adjusted under 35 U.S.C. 154(b) by 542 days.

(21) Appl. No.: 12/693,527

(22) Filed: Jan. 26, 2010

(65) Prior Publication Data

US 2011/0183795 A1   Jul. 28, 2011

(51) Int. Cl.
*F16H 59/00* (2006.01)

(52) U.S. Cl.
USPC .................................. 474/80; 474/83; 474/3

(58) Field of Classification Search
USPC ........................ 474/78–83, 3, 101, 144, 140
See application file for complete search history.

(56) References Cited

U.S. PATENT DOCUMENTS

| | | | | |
|---|---|---|---|---|
| 4,223,562 | A * | 9/1980 | Nagano et al. | 474/82 |
| 4,551,121 | A * | 11/1985 | Nagano | 474/140 |
| 5,246,405 | A * | 9/1993 | Nagano | 474/140 |
| 5,312,301 | A * | 5/1994 | Kobayashi | 474/80 |
| 5,624,336 | A * | 4/1997 | Kojima | 474/82 |
| 6,234,927 | B1 * | 5/2001 | Peng | 474/82 |
| 6,572,500 | B2 | 6/2003 | Tetsuka | |
| 6,923,740 | B2 * | 8/2005 | Nanko | 474/82 |
| 7,438,657 | B2 * | 10/2008 | Nakai et al. | 474/80 |
| 7,677,998 | B2 * | 3/2010 | Tetsuka | 474/82 |
| 2004/0166973 | A1 * | 8/2004 | Nanko | 474/80 |
| 2004/0185975 | A1 | 9/2004 | Chen | |
| 2005/0272541 | A1 * | 12/2005 | Valle et al. | 474/80 |
| 2005/0282671 | A1 | 12/2005 | Emura et al. | |
| 2007/0060427 | A1 * | 3/2007 | Nankou | 474/80 |
| 2007/0191158 | A1 * | 8/2007 | Ichida et al. | 474/80 |
| 2007/0293359 | A1 * | 12/2007 | Yamamoto et al. | 474/80 |
| 2008/0026888 | A1 * | 1/2008 | Yamamoto et al. | 474/80 |
| 2008/0026889 | A1 | 1/2008 | Chiang | |
| 2008/0182689 | A1 * | 7/2008 | Fujii et al. | 474/82 |

FOREIGN PATENT DOCUMENTS

| | | |
|---|---|---|
| EP | 0 428 085 A1 | 5/1991 |
| EP | 0 519 405 A1 | 12/1992 |
| EP | 1 602 572 A1 | 12/2005 |
| EP | 1 818 254 A2 | 8/2007 |
| EP | 1 950 133 A2 | 7/2008 |

OTHER PUBLICATIONS

European Search Report of corresponding EP Application No. 10 17 1707.2 dated Apr. 4, 2011.

* cited by examiner

*Primary Examiner* — William E Dondero
*Assistant Examiner* — Minh Truong
(74) *Attorney, Agent, or Firm* — Global IP Counselors

(57) ABSTRACT

A bicycle structure is provided with a crankset and a front derailleur. The crankset includes a plurality of chain rings, with a largest chain ring of the plurality of chain rings having a plurality of teeth with teeth bottoms interposed between adjacent ones of the teeth. The front derailleur includes a chain guide having a chain guide slot partially defined by a first chain engagement surface with a protruding part that protrudes outwardly from the first chain engagement surface into the chain guide slot. The protruding part is located away from the teeth bottoms of the largest chain ring in a radial outside direction of the largest chain ring by a prescribed distance in a range from eight millimeters to sixteen millimeters.

21 Claims, 20 Drawing Sheets

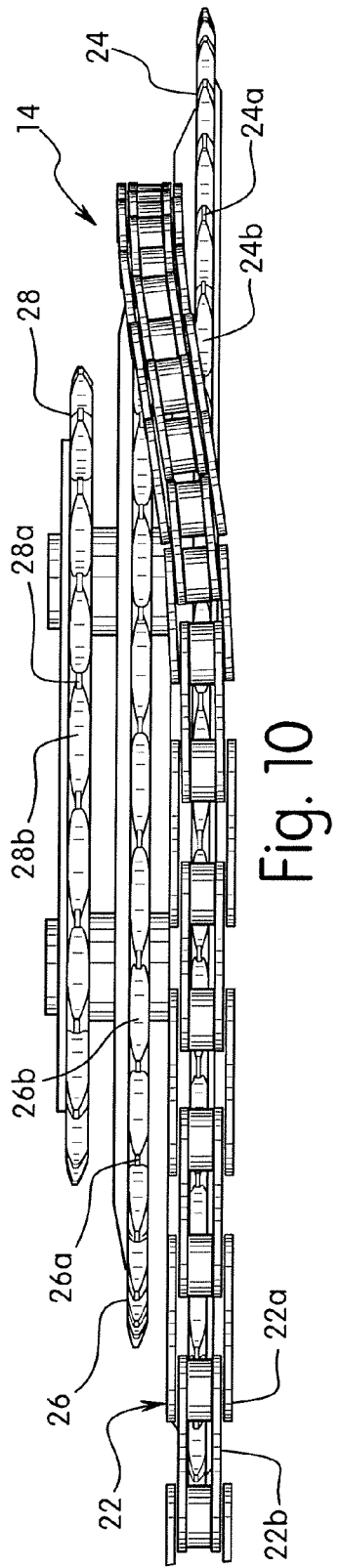
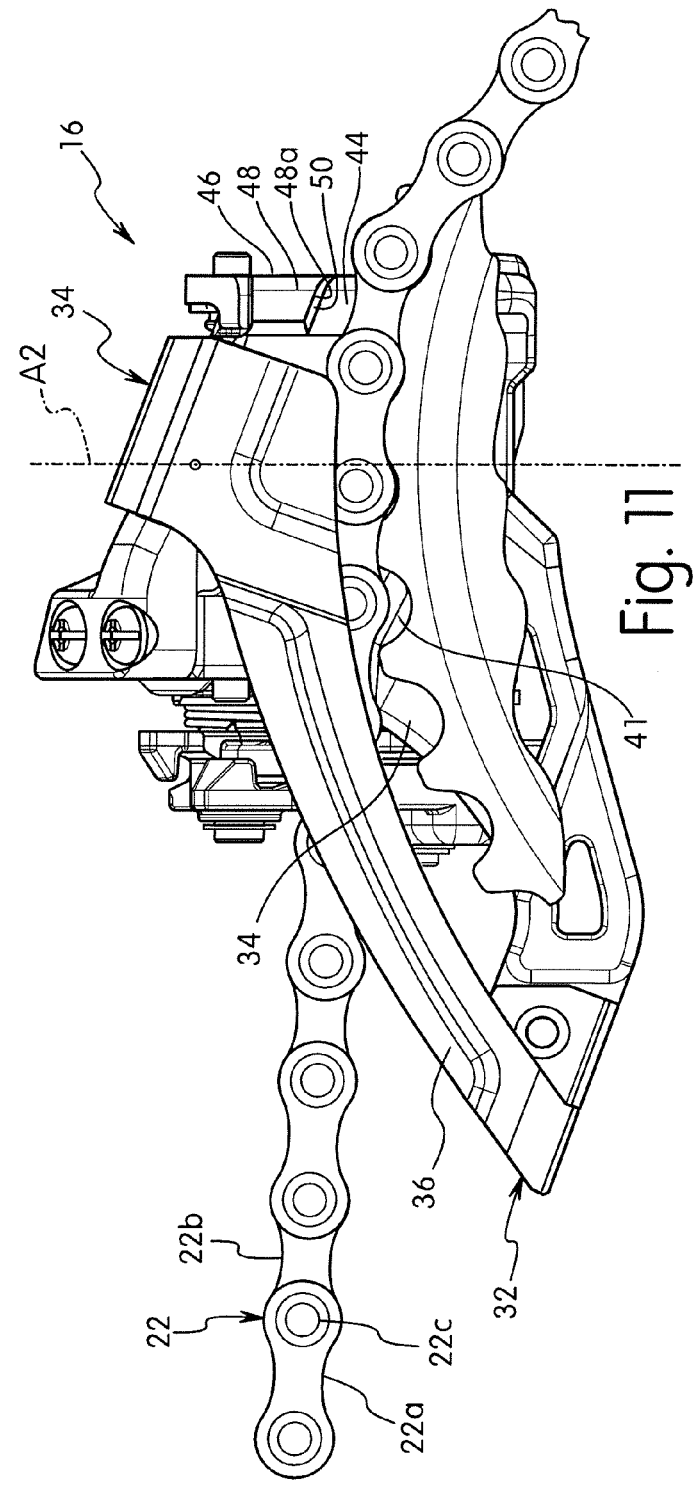
Fig. 10
Fig. 11

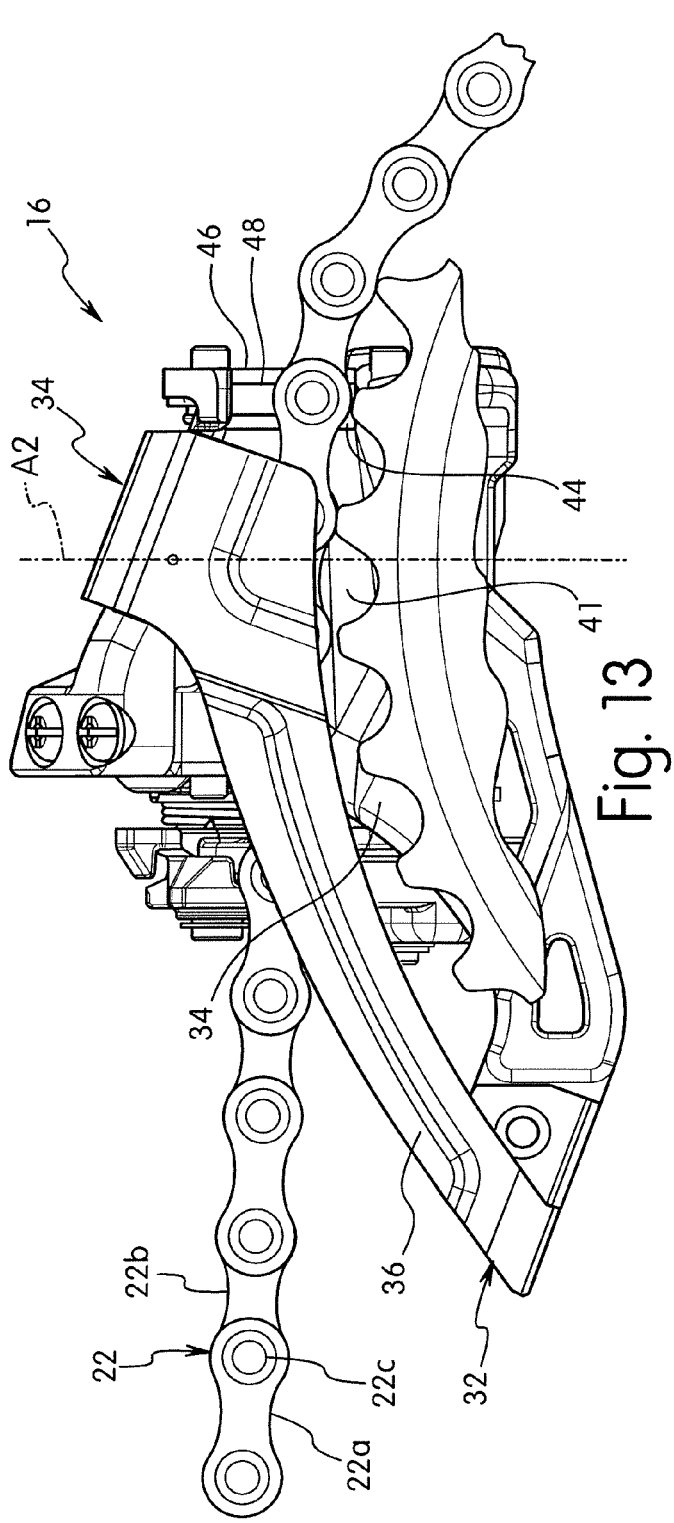
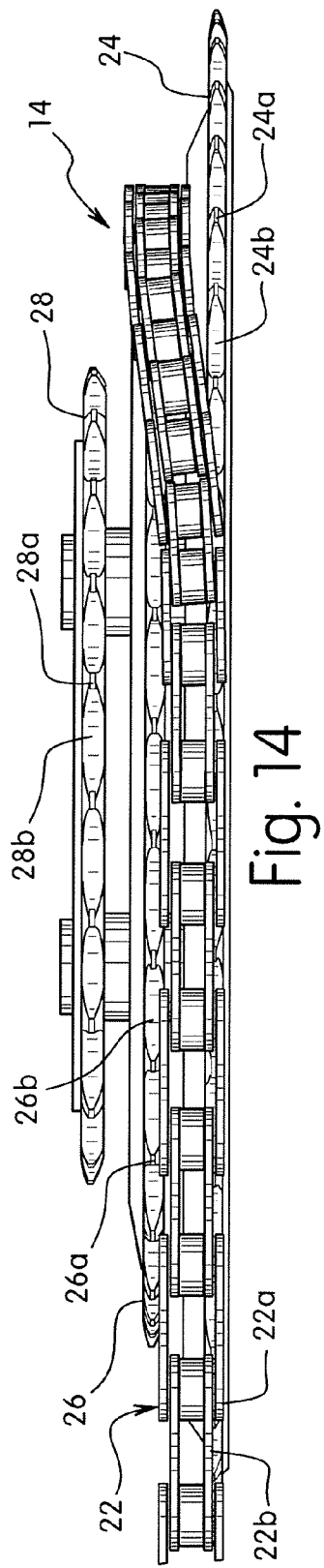
Fig. 13
Fig. 14

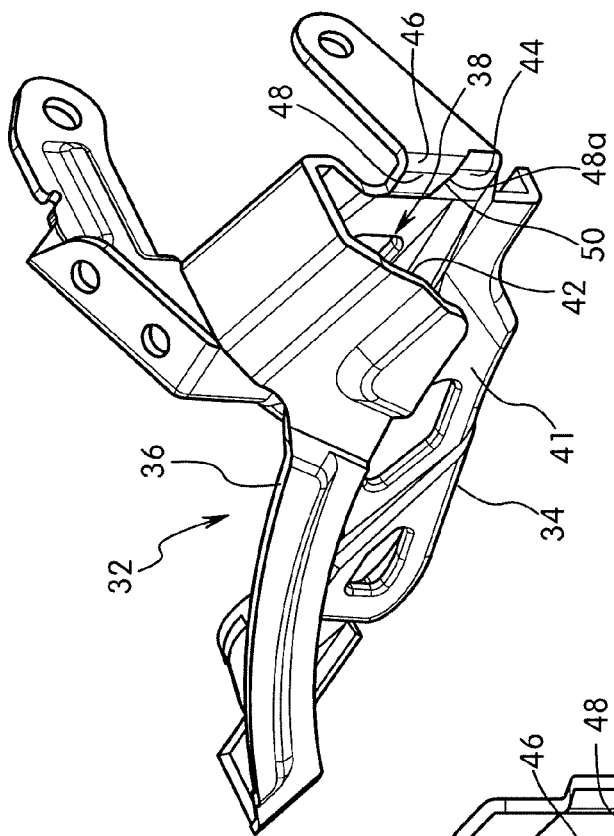
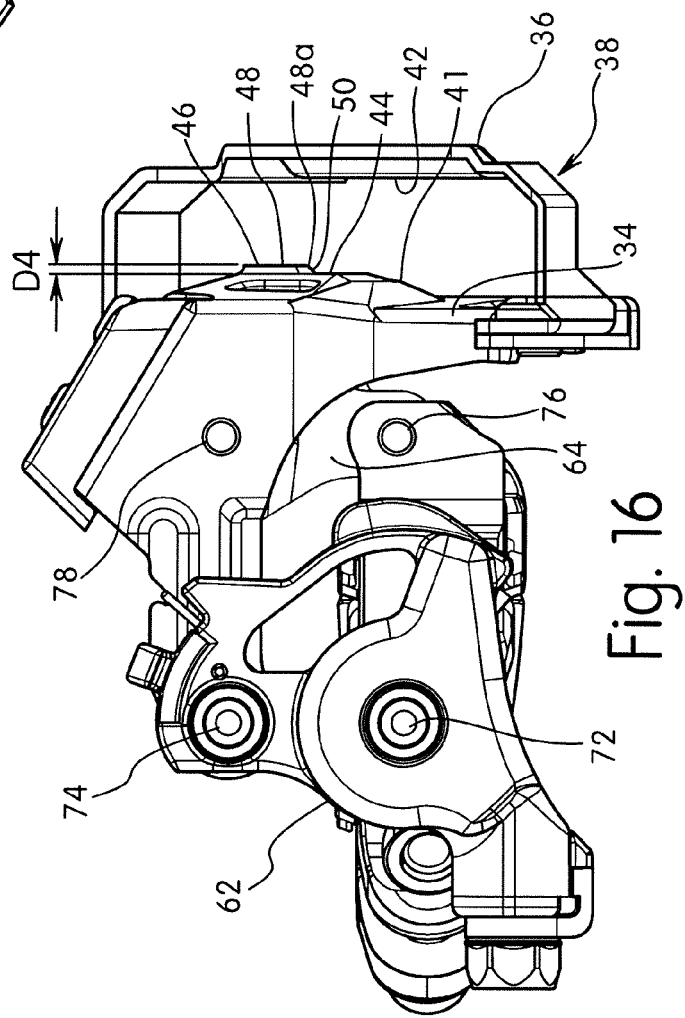

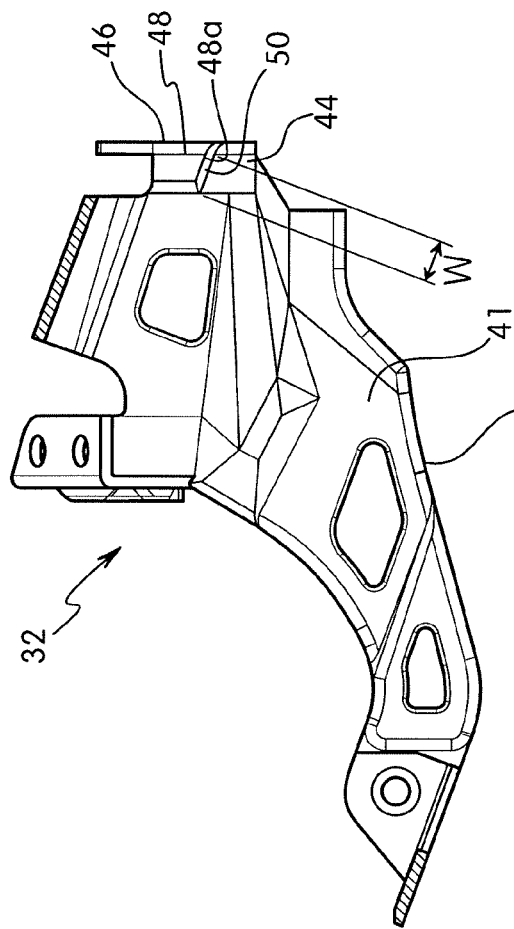
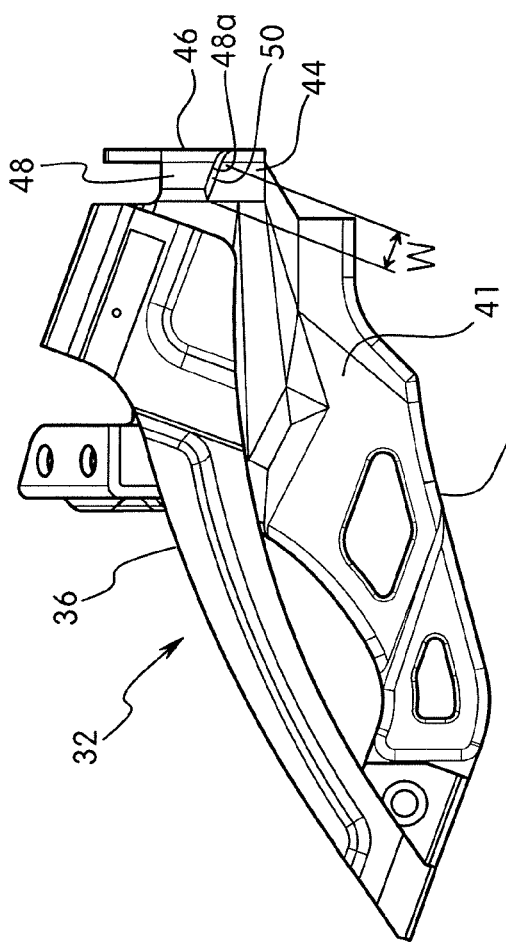

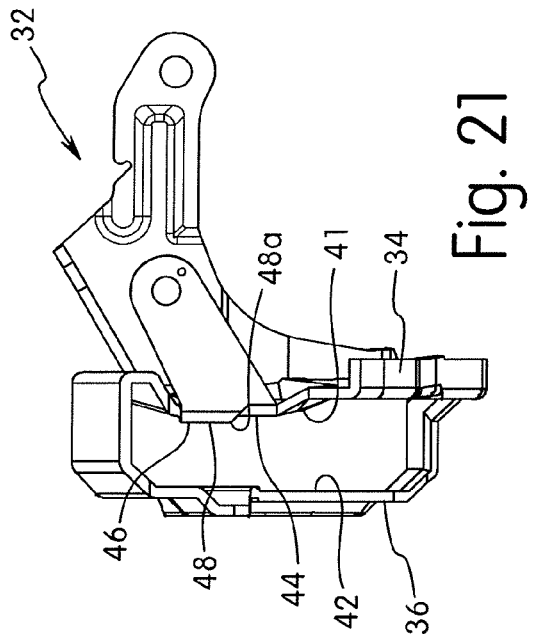
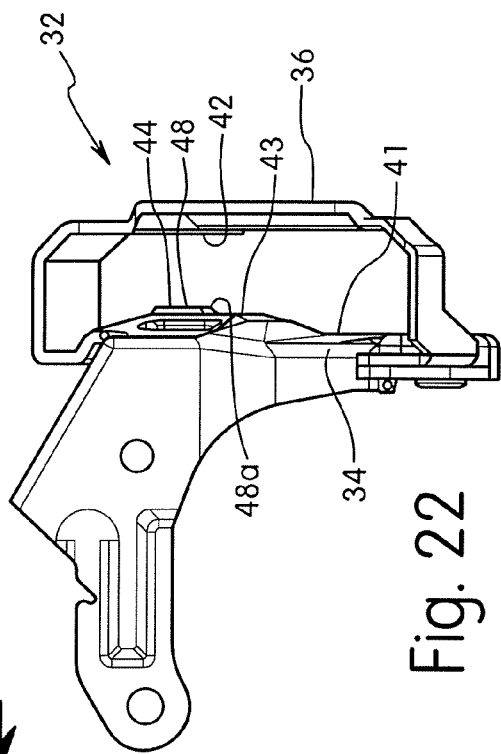
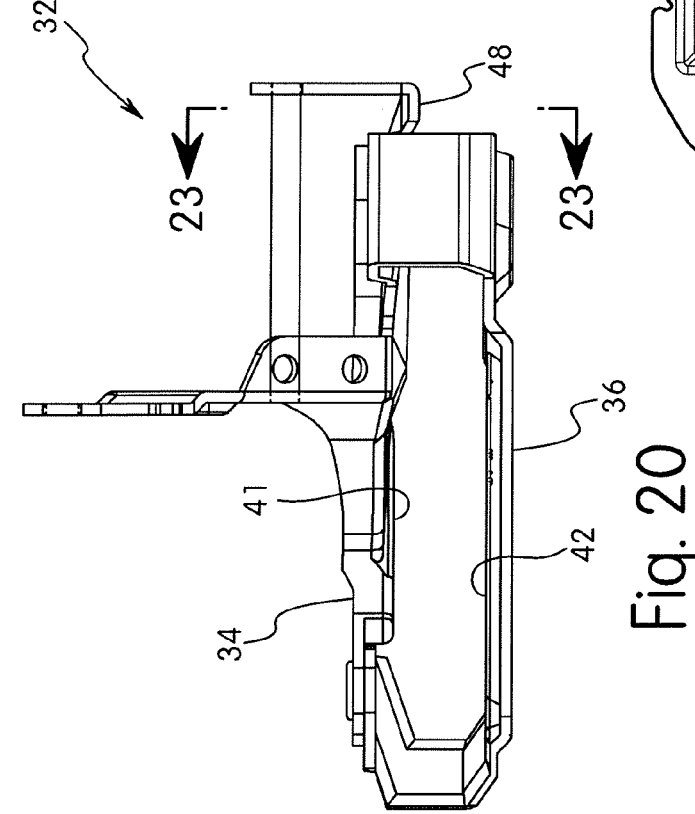

BICYCLE STRUCTURE

BACKGROUND

1. Field of the Invention

This invention generally relates to a bicycle front derailleur. More specifically, the present invention relates to a bicycle front derailleur, which is designed to aid in an upshifting operation of a chain onto the largest sprocket of a crankset.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned over the past years is the bicycle drive train. Specifically, manufacturers of bicycle components have been continually improving shifting performance of the various shifting components such as the shifter, the shift cable, the derailleur, the chain and the sprocket or sprockets.

Generally, a front derailleur is mounted to the bicycle frame adjacent to the front sprockets to shift a chain laterally between the front sprockets. A front derailleur includes a fixed member non-movably secured to the bicycle frame, and a movable member with a chain guide that is movably supported relative to the fixed member to move between at least two lateral shift positions. Typically, a linkage assembly is coupled between the fixed member and the movable member in order to movably support the movable member with the chain guide. The chain guide has a pair of cage plates or guide plates arranged to selectively contact and move the chain between the front sprockets. On example of this type of conventional front derailleur is disclosed in U.S. Patent Publication No. 2008/0026889. With a front derailleur such as the one disclosed in this publication, the chain can sometimes get caught on a tip of a tooth of the largest sprocket of a crankset during an upshifting operation.

SUMMARY

A bicycle structure is to provide that can aid in moving a chain onto the largest sprocket of a crankset during an upshifting operation when the chain gets caught on a tip of a tooth of the largest sprocket.

In accordance with one aspect of the present invention, a bicycle structure is provided that mainly comprises a crankset and a front derailleur. The crankset includes a plurality of chain rings, with a largest chain ring of the plurality of chain rings having a plurality of teeth with teeth bottoms interposed between adjacent ones of the teeth. The front derailleur includes a chain guide having a chain guide slot partially defined by a first chain engagement surface with a protruding part that protrudes outwardly from the first chain engagement surface into the chain guide slot. The protruding part is located away from the teeth bottom of the largest chain ring in a radial outside direction of the largest chain ring by a prescribed distance in a range from eight millimeters to sixteen millimeters.

BRIEF DESCRIPTION OF THE DRAWINGS

Referring now to the attached drawings which form a part of this original disclosure:

FIG. 10 is an enlarged outside elevational view of the front derailleur of the bicycle structure in accordance with the first embodiment with the chain shown travelling along a largest chain travel path corresponding to a chain line of the chain with the outer link of the chain fully engaged with a tooth of the largest chain ring;

FIG. 11 is a top plan view of the portion of the crankset illustrated in FIGS. 9 and 10 showing the chain fully engaged with the tooth of the largest chain ring during the fourth (final) stage of the shifting operation to the largest chain ring in a successful (normal) shifting operation;

FIG. 13 is an enlarged outside elevational view of the front derailleur of the bicycle structure in accordance with the first embodiment with the chain shown travelling along a misengaged chain travel path corresponding to a chain line of the chain with the outer link of the chain caught on a tip of a tooth of the largest chain ring;

FIG. 14 is a top plan view of the portion of the crankset illustrated in FIGS. 12 and 13 showing the outer link of the chain caught on the tip of the tooth of the largest chain ring during the fourth (final) stage of the shifting operation to the largest chain ring in an unsuccessful (abnormal) shifting operation;

FIG. 16 is a rear elevational view of the front derailleur illustrated in FIG. 15;

FIG. 17 is a perspective view of the chain cage of the front derailleur of the bicycle structure illustrated in FIGS. 13 to 16;

FIG. 18 is an outside elevational view of the chain cage of the front derailleur of the bicycle structure illustrated in FIGS. 13 to 17;

FIG. 19 is a longitudinal cross sectional view of the chain cage of the front derailleur of the bicycle structure taken along the center line of the chain guide slot of the chain guide;

FIG. 20 is a top plan view of the chain cage of the front derailleur of the bicycle structure in accordance with the first embodiment;

FIG. 21 is a front elevational view of the chain cage of the front derailleur of the bicycle structure in accordance with the first embodiment;

FIG. 22 is a rear elevational view of the chain cage of the front derailleur of the bicycle structure in accordance with the first embodiment;

DETAILED DESCRIPTION OF THE ILLUSTRATED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
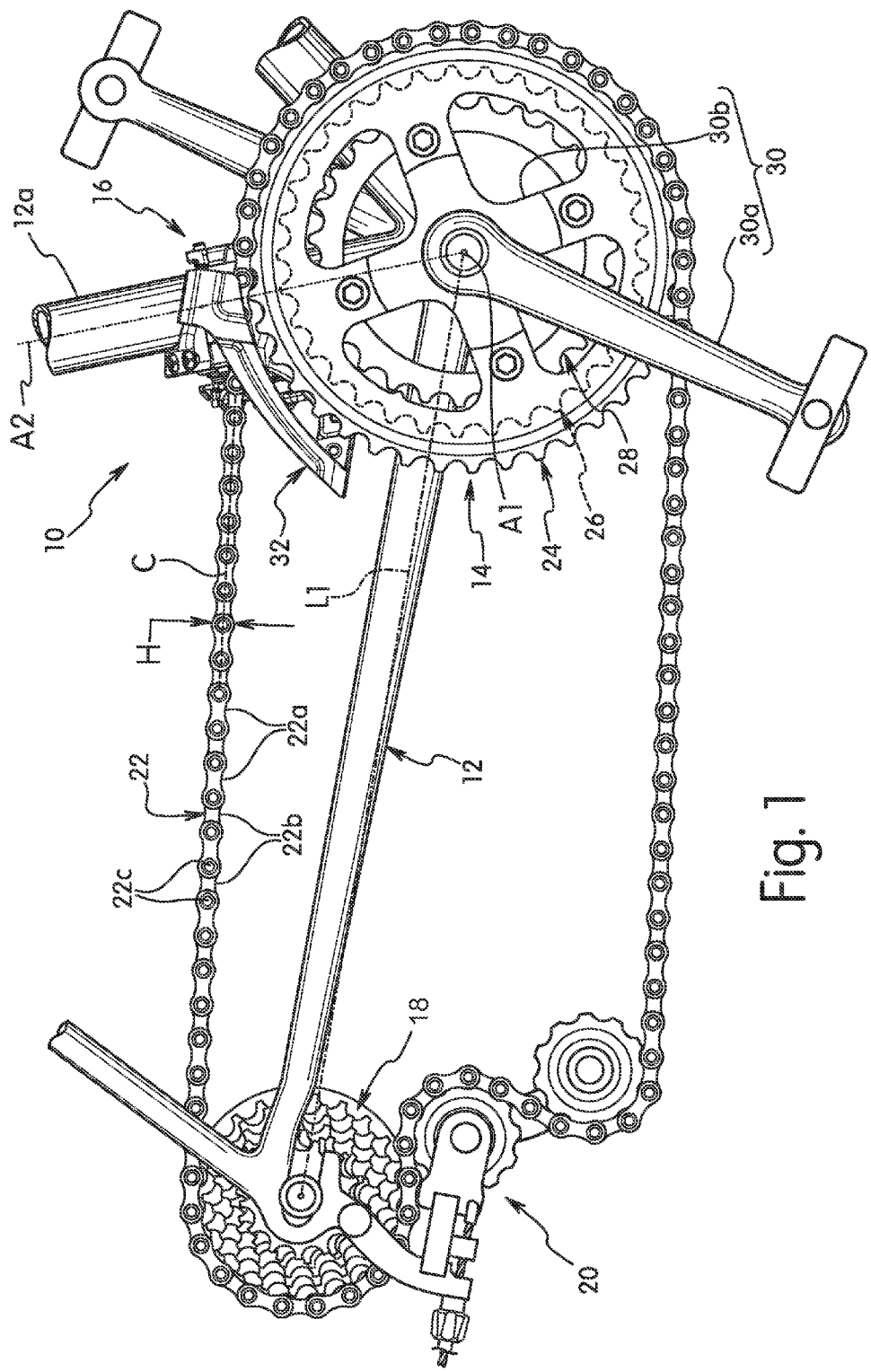
FIG. 1 is a side elevational view of a portion of a bicycle drive train with a bicycle structure that includes a crankset and a front derailleur in accordance with a first embodiment.

Referring initially to FIG. 1, a bicycle structure 10 is illustrated in accordance with a first embodiment. The bicycle structure 10 includes a bicycle frame 12, a front crankset 14, a front derailleur 16, a rear sprocket set 18, a rear derailleur 20 and a chain 22. The frame 12 has a seat tube 12a with the front derailleur 16 being fixedly mounted to the seat tube 12a. In the illustrated embodiment, the frame 12 is a rigid rear fork. However, the bicycle structure 10 is not limited to such a frame. Rather, the bicycle structure 10 can be used with other types of frames such as a frame with a rear suspension. The front crankset 14 is rotatably mounted to the frame 12 about a rotational axis A1 via a conventional bottom bracket (not shown). The rear sprocket set 18 is mounted to a rear hub (not shown) to rotate with the rear hub about a rotational axis A2 for driving a rear wheel (not shown) in a conventional manner. The rear derailleur 20 is fixedly mounted to a hanger portion of the frame 12. The chain 22 is engaged with the front crankset 14, the rear sprocket set 18 and the rear derailleur 20 in a conventional manner.

The front derailleur 16 and the rear derailleur 20 are cable operated chain shifting devices that are operated by shifters (not shown) in a conventional manner to move the chain 22 for shifting gears. In the case of the front derailleur 16, the front crankset 14 includes a plurality of front sprockets or chain rings 24, 26 and 28 in which the front derailleur 16 is used to shift gears by moving the chain 22 laterally with respect to a center plane of the bicycle frame 12 to shift the chain 22 between adjacent ones of the front chain rings 24, 26 and 28. In the illustrated embodiment, the front crankset 14 only has three front sprockets or chain rings 24, 26 and 28 as shown. However, it will be apparent to those skilled in the art from this disclosure that the front crankset 14 can have only two sprockets or chain rings, if needed and/or desired. Preferably, the axial faces of the chain rings 24 and 26 can include various shift aiding structures (not shown) such as described in U.S. Pat. No. 4,889,521, if needed and/or desired.

In the illustrated embodiment of FIG. 1, the chain 22 is a conventional bicycle chain that has a plurality of outer chain links 22a and a plurality of inner chain links 22b connected together by pins 22c. The chain 22 has a maximum height H, which typically ranges from 8.1 millimeters to 8.4 millimeters. Preferably, each of the pins 22c has a chain roller (not shown in FIG. 1). Since chains such as the chain 22 are well known in the bicycle field, the chain 22 will not be discussed in further detail.

Figure 2:
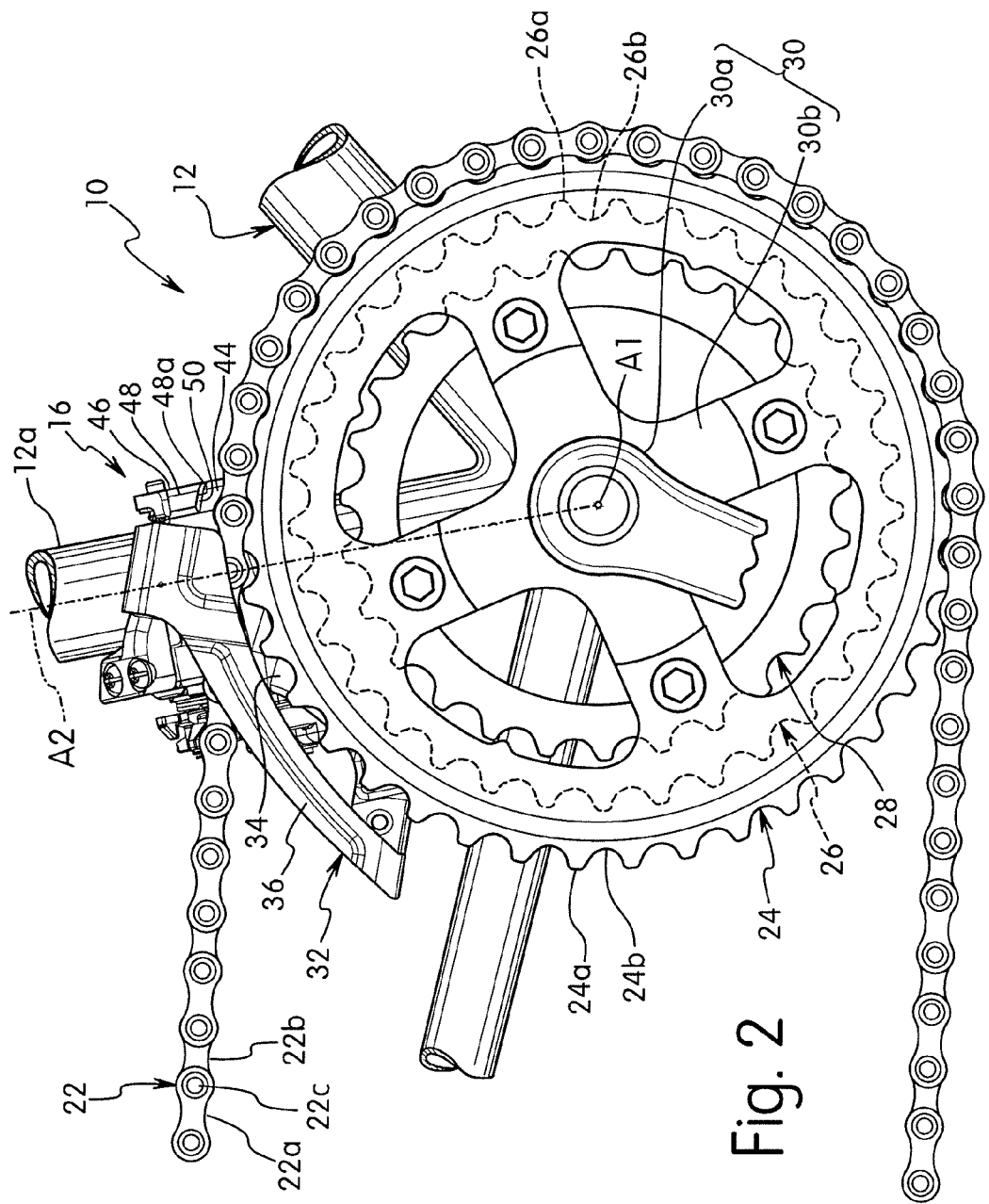
FIG. 2 is an enlarged elevational view of the bicycle structure with the crankset and the front derailleur in accordance with the chain being in a fully engaged (non-shifting) position with the teeth of the largest chain ring.

As best seen in FIG. 2, the front crankset 14 includes a crank member 30 with a crank arm 30a and a spider 30b for supporting the chain rings 24, 26 and 28 in a conventional manner. The chain ring 24 has a plurality of teeth 24a with teeth bottoms 24b interposed between adjacent ones of the teeth 24a. The chain ring 26 has a plurality of teeth 26a with teeth bottoms 26b interposed between adjacent ones of the teeth 24a. The chain ring 28 has a plurality of teeth 28a with teeth bottoms 28b interposed between adjacent ones of the teeth 28a. In the illustrated embodiment, the chain rings 24, 26 and 28 are rigid metal members, with the chain ring 24 having the largest diameter and the largest number of teeth 24a among the chain rings 24, 26 and 28. Thus, the chain ring 24 constitutes a largest chain ring of the front crankset 14. The chain ring 26 is a middle chain ring with a diameter smaller than the chain ring 24 and a smaller number of teeth 26a than the number of the teeth 24a of the chain ring 24. The chain ring 28 has the smallest diameter and the smallest number of teeth 28 among the chain rings 24, 26 and 28. The chain ring 28 constitutes a smallest chain ring of the front crankset 14.

Figure 3:
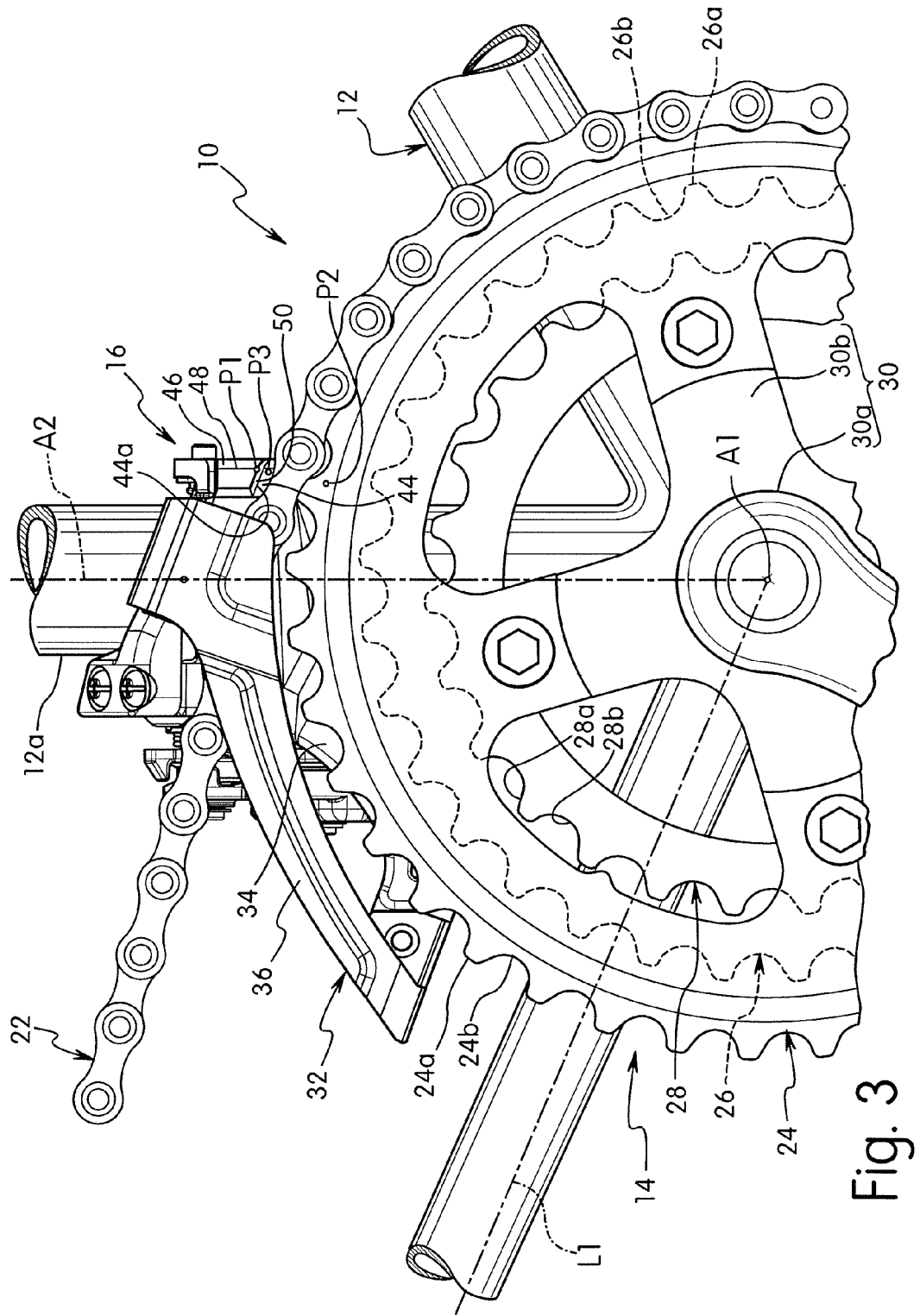
FIG. 3 is a further enlarged elevational view of a portion of the crankset and the front derailleur in accordance with the chain being in a fully engaged (non-shifting) position with the teeth of the largest chain ring.
Figure 4:
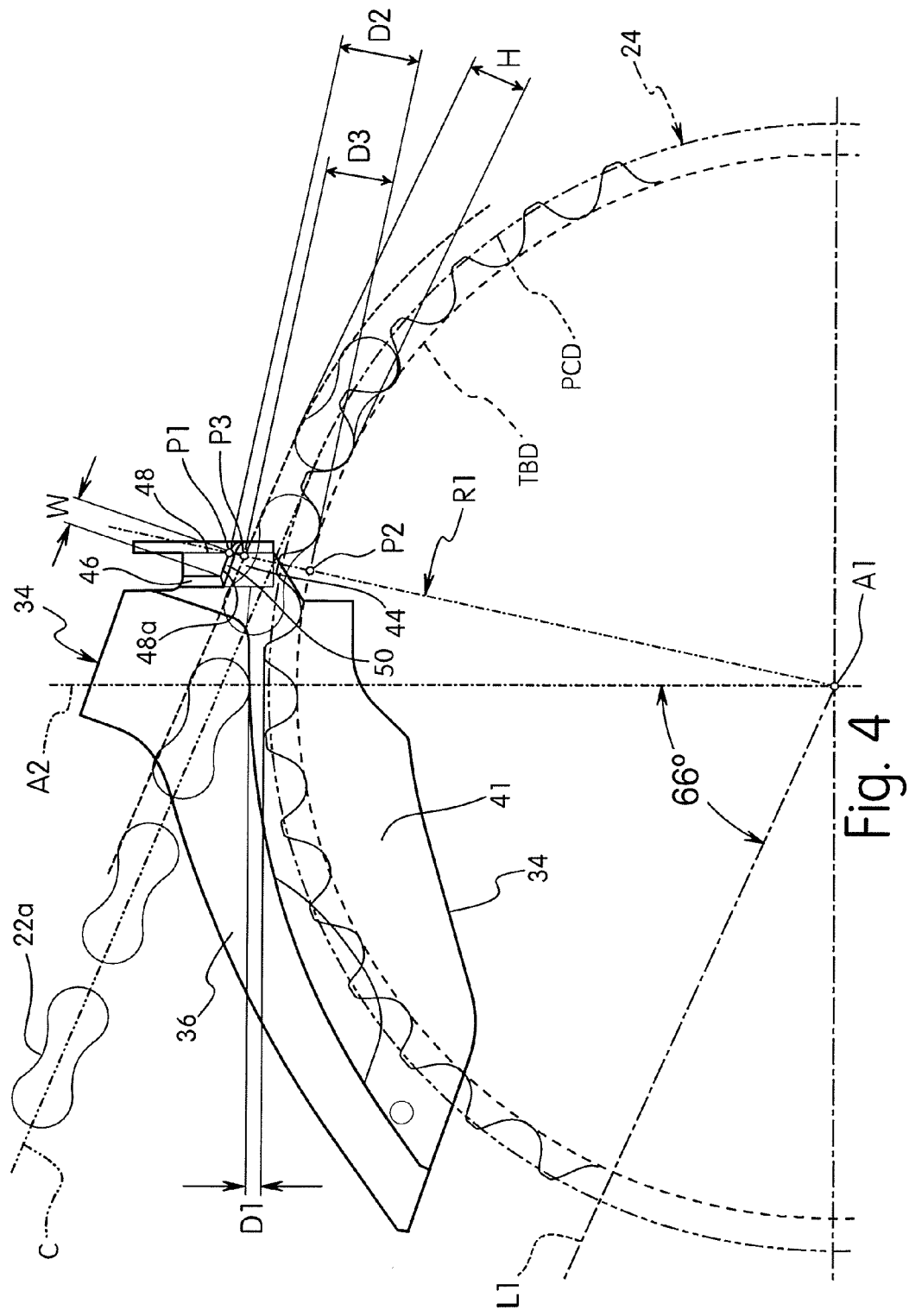
FIG. 4 is a diagrammatic view of the selected portions of the crankset, the front derailleur and the chain that are illustrated in FIG. 3.
Figure 5:
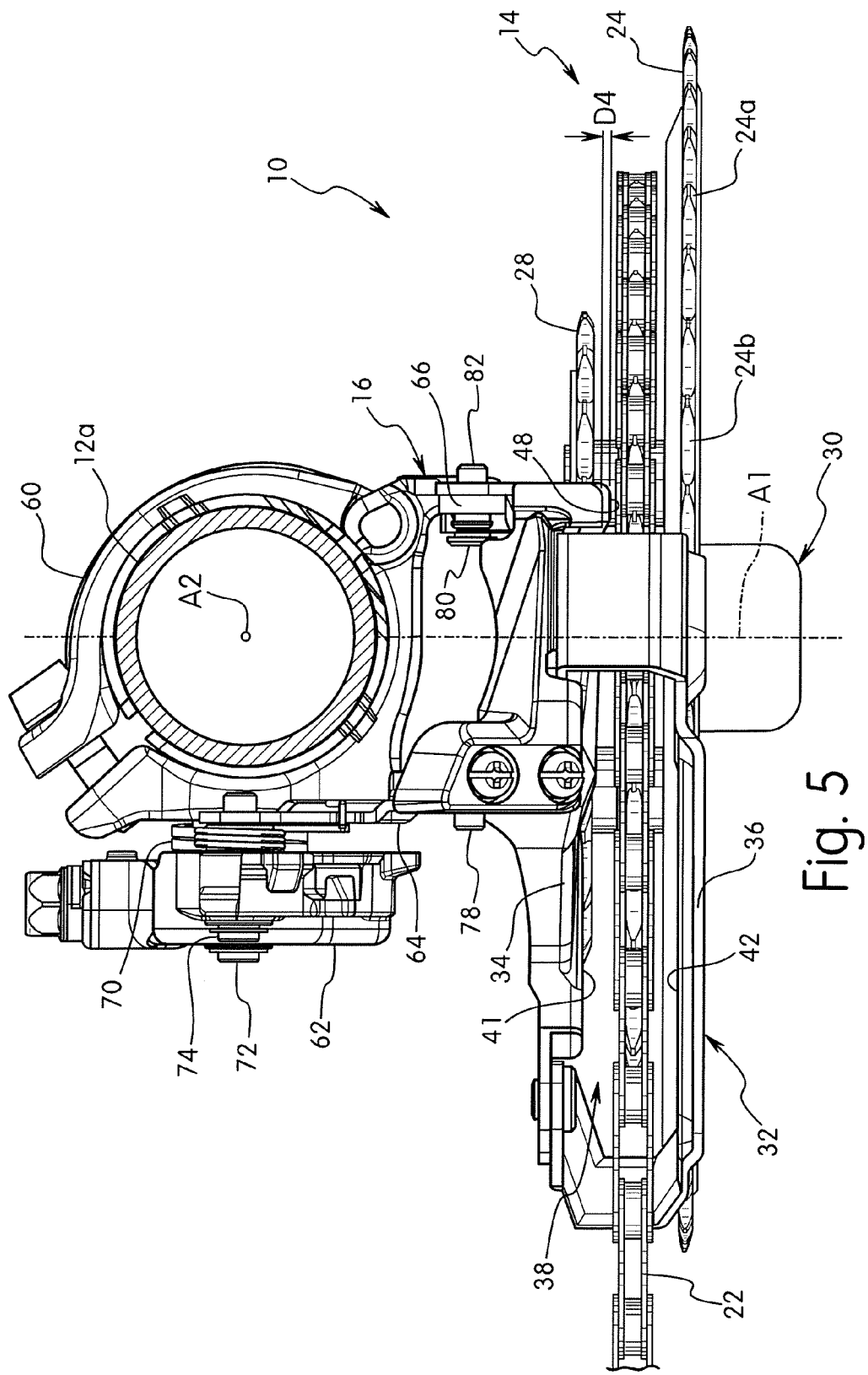
FIG. 5 is top plan view of the crankset and the front derailleur with the chain being in a fully engaged (non-shifting) position with the teeth of the middle chain ring.
Figure 6:
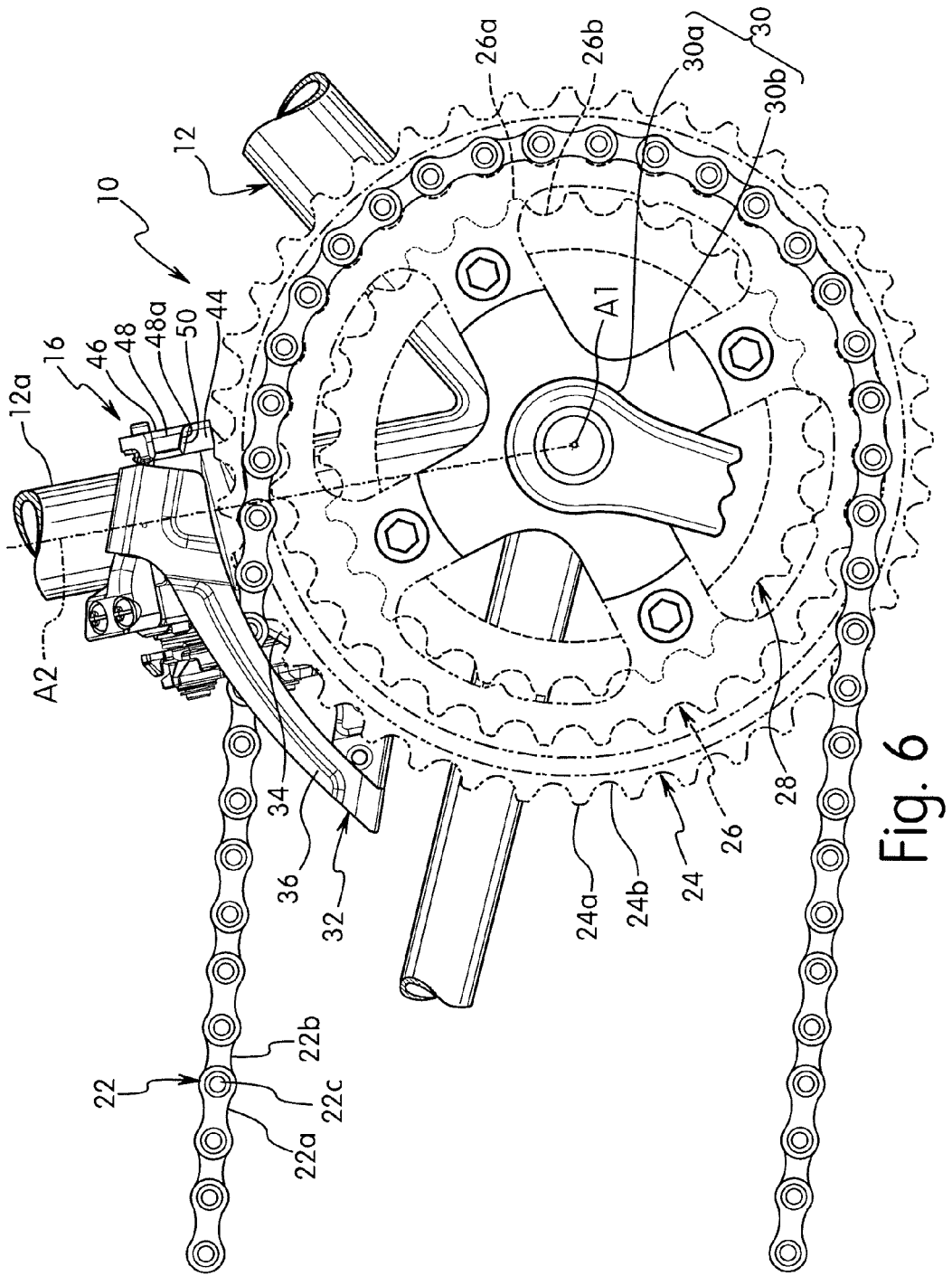
FIG. 6 is a partial elevational view of a portion of the crankset with the chain on the middle chain ring with the front derailleur applying a lateral shifting force to the chain for initiating a shifting operation of the chain from the middle chain ring to the largest chain ring of the crankset during a first (initial) stage of the shifting operation to the largest chain ring.
Figure 7:
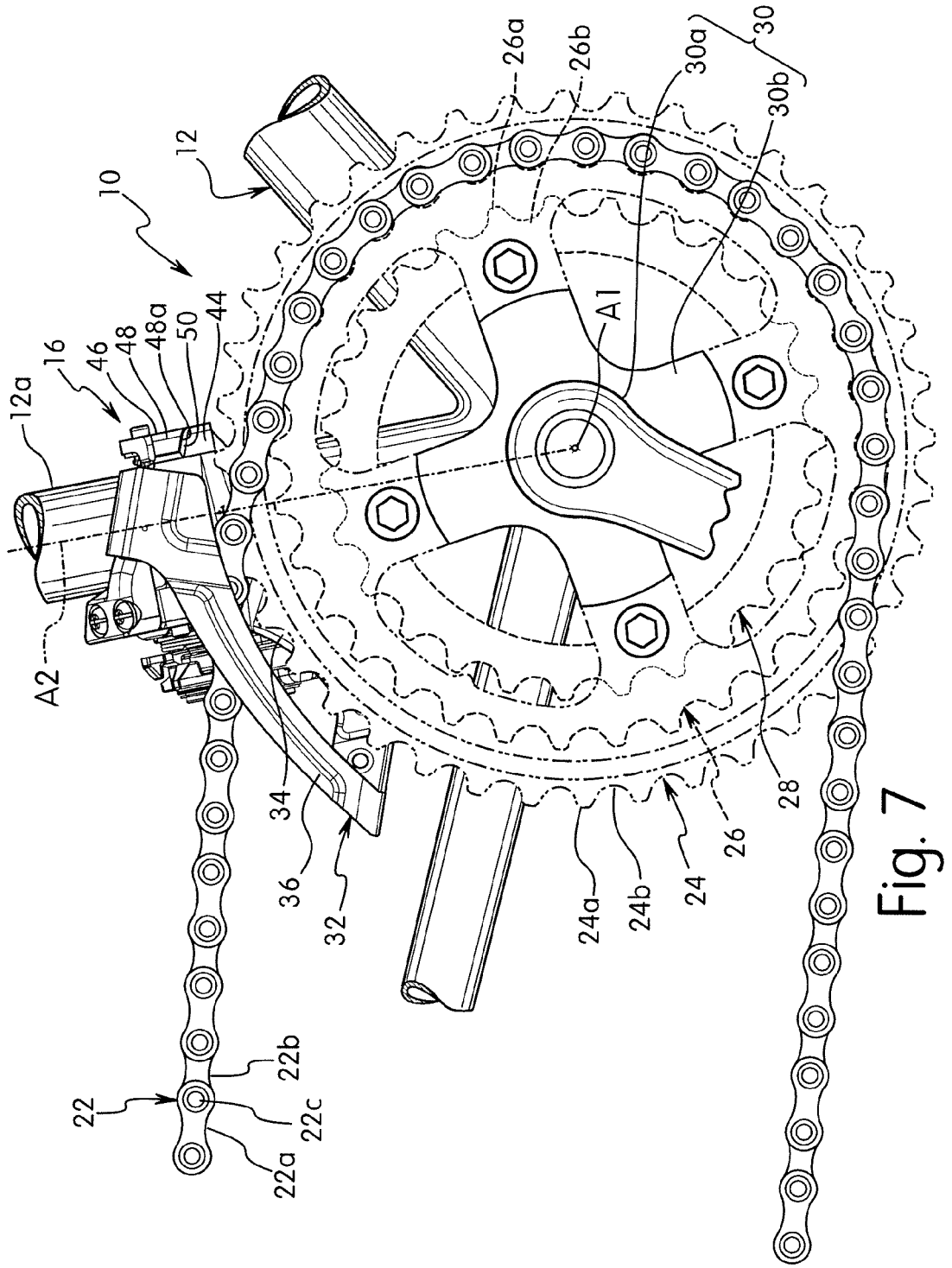
FIG. 7 is a partial elevational view of a portion of the crankset with the chain on the middle chain ring with the chain contacting a shift assist projection during a second stage of the shifting operation to the largest chain ring.
Figure 8:
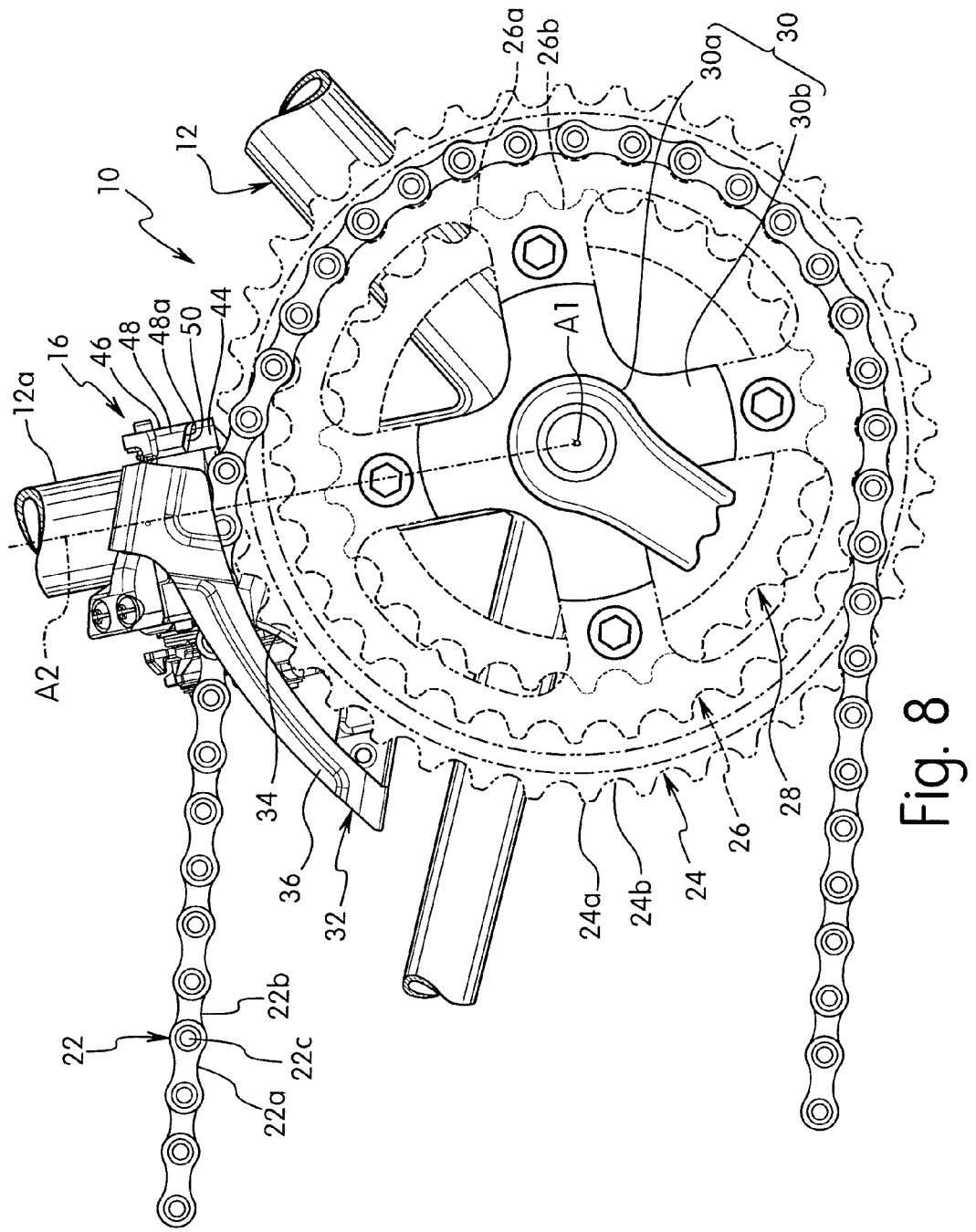
FIG. 8 is a partial elevational view of a portion of the crankset with the chain being lifted from the middle chain ring to the largest chain ring during a third stage of the shifting operation to the largest chain ring.
Figure 9:
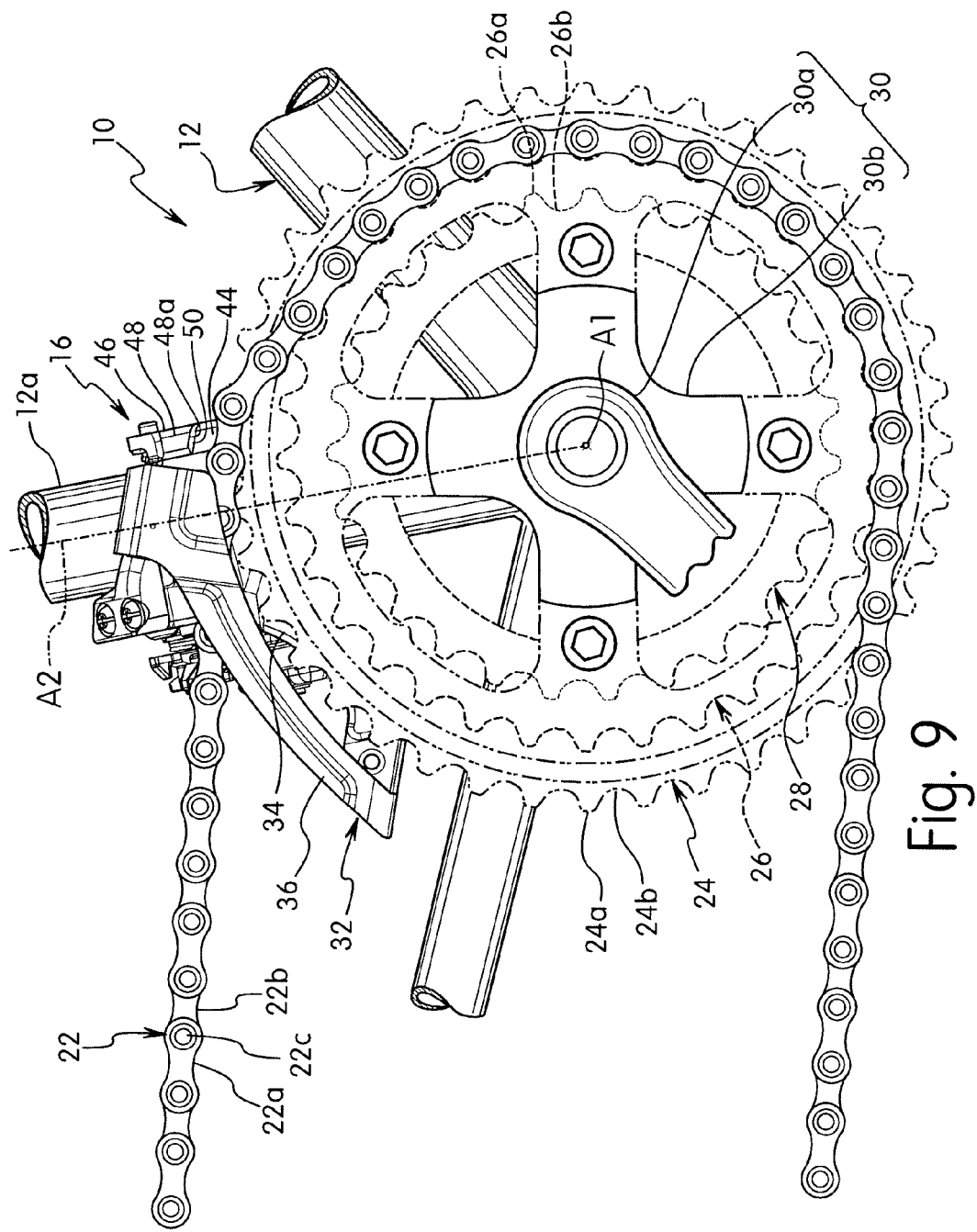
FIG. 9 is a partial elevational view of a portion of the crankset with the chain fully engaged with a tooth of the largest chain ring during a fourth (final) stage of the shifting operation to the largest chain ring in a successful (normal) shifting operation.

Referring to FIGS. 3 to 5, the front derailleur 16 is positioned on the seat tube 12a along an upper periphery of the largest chain ring 24. The front derailleur 16 is an upswing or top swing type front derailleur. The front derailleur 16 has a chain guide 32 for moving the chain 22 between adjacent ones of the front chain rings 24, 26 and 28 in response to a shifting operation that moves the chain 22 laterally with respect to a center plane of the bicycle frame 12. The front derailleur 16 is relatively conventional, except for the chain guide 32. Accordingly, the front derailleur 16 will not be explained and/or illustrated in detail herein, except as related to the chain guide 32. The basic operation of the front derailleur 16 can be understood from U.S. Pat. No. 6,923,740. Also, bicycles and their various components are well known in the bicycle field, and thus, the bicycle and its various components will not be discussed or illustrated in detail herein, except for the components that relate to the front derailleur 16.

The chain guide 32 is a rigid member that is typically made of a rigid metal material. As best seen in FIG. 5, the chain guide 32 basically includes an inner guide plate 34 and an outer guide plate 36 rigidly connected to the inner guide plate 34 in a spaced arrangement to form a chain guide slot 38 therebetween. The chain guide slot 38 is a chain receiving area in which the chain 22 passes through during rotation of the front crankset 14. Normally, the chain 22 only engages the guide plates 34 and 36 during a shifting operation. In other words, for example, when the chain 22 is in a fully engaged position with the largest chain ring 24, the chain guide 32 is vertically positioned directly over the largest chain ring 24. Similarly, the chain guide 32 is vertically positioned directly over the chain rings 26 and 28, respectively, when the chain 22 is in a fully engaged position with the chain rings 26 and 28, respectively.

The chain guide slot 38 is basically defined by a first chain engagement surface 41 and a second chain engagement surface 42. The first chain engagement surface 41 contacts the inside surface of the chain 22 to perform an upshifting operation (i.e., shifting from a smaller diameter sprocket to a larger diameter sprocket). The second chain engagement surface 42 contacts the outside surface of the chain 22 to perform a downshifting operation (i.e., shifting from a larger diameter sprocket to a smaller diameter sprocket). Each of the guide plates 34 and 36 is preferably constructed of a hard rigid material. For example, each of the guide plates 34 and 36 of the chain guide 32 is preferably constructed of metal such as a rigid sheet metal that is bent to the desired shape. The inner and outer guide plates 34 and 36 are connected together at the front of the chain guide 32 and at the rear of the chain guide 32.

Referring to FIG. 4, portions of the crankset 14, the front derailleur 16 and the chain 22 are diagrammatically illustrated to better understand the dimensional relationships between the crankset 14, the front derailleur 16 and the chain 22. The dimensional relationships between the crankset 14, the front derailleur 16 and the chain 22 are taken with the front derailleur 16 being located in the top gear position so that the chain guide 32 is vertically positioned directly over the largest chain ring 24. In the illustrated embodiment, the seat tube 12*a* has a center axis A2 that passes through the rotational axis A1 of the front crankset 14. The center axis A2 of the seat tube 12*a* forms an acute angle of sixty-six degrees with a line L1 that passes through the rotational axes A1 and A2. The center axis A2 of the seat tube 12*a* constitutes a mounting axis of the front derailleur 16.

As best seen in FIG. 4, the largest chain ring 24 has a tooth bottom diameter TBD and a pitch circle diameter PCD. The tooth bottom diameter TBD is a diameter of the largest chain ring 24 that corresponds to the locations of the radial innermost point of the teeth bottoms 24*b* with respect to the center of rotation A1. The pitch circle diameter PCD is a diameter of the largest chain ring 24 that corresponds to the location of the longitudinal center of the chain 22 with the rollers fully engaged with the teeth bottoms 24*b*. When the front derailleur 16 is installed on the seat tube 12*a*, the lower edge of the outer guide plate 36 at the foremost point is spaced from the tips of the teeth 24*a* be a prescribed radial distance D1, which is two millimeters±one millimeter as measured along the center axis A2 of the seat tube 12*a*.

As seen in FIG. 1, the chain 22 travels along a chain path C as the chain 22 travels passes through the chain guide slot 38 of the chain guide 32 when the chain 22 is fully engaged with the largest chain ring 24 of the front crankset 14 and the largest gear of the rear sprocket set 18. The path of the chain 22 through the chain guide slot 38 of the chain guide 32 changes depending on which the rear sprocket is engaged with the chain 22. Since the chain path C causes the chain 22 to be the laterally skewed with respect to the center plane of the bicycle frame 12 as compared to the other chain paths, an upshifting operation the chain 22 from the middle chain ring 26 onto the largest chain ring 24 of the front crankset 14 is the most difficult, while the chain 22 is fully engaged with the largest gear of the rear sprocket set 18.

Figure 12:
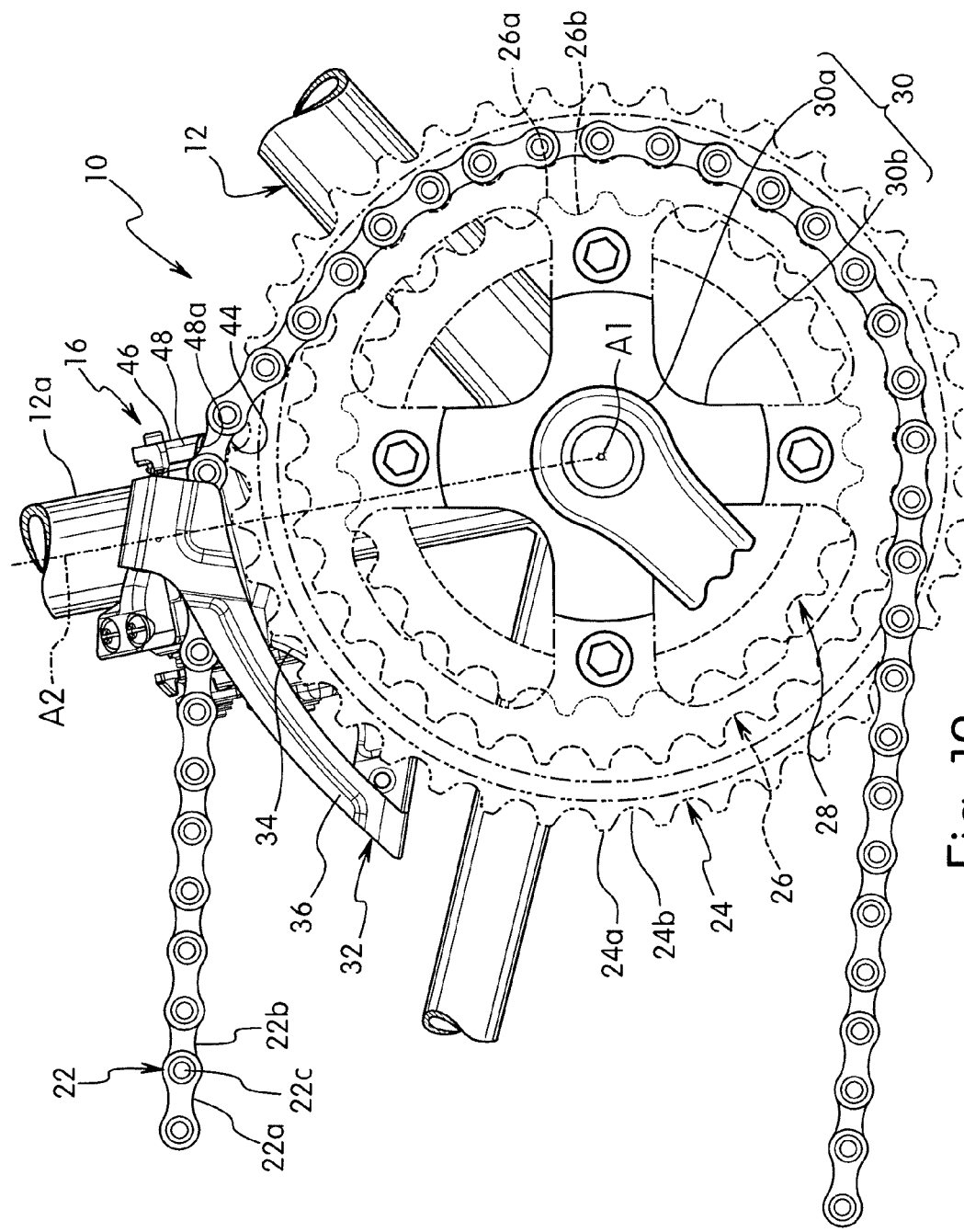
FIG. 12 is a partial elevational view of a portion of the crankset with an outer link of the chain caught on a tip of a tooth of the largest chain ring during a fourth (final) stage of the shifting operation to the largest chain ring in an unsuccessful (abnormal) shifting operation.
Figure 15:
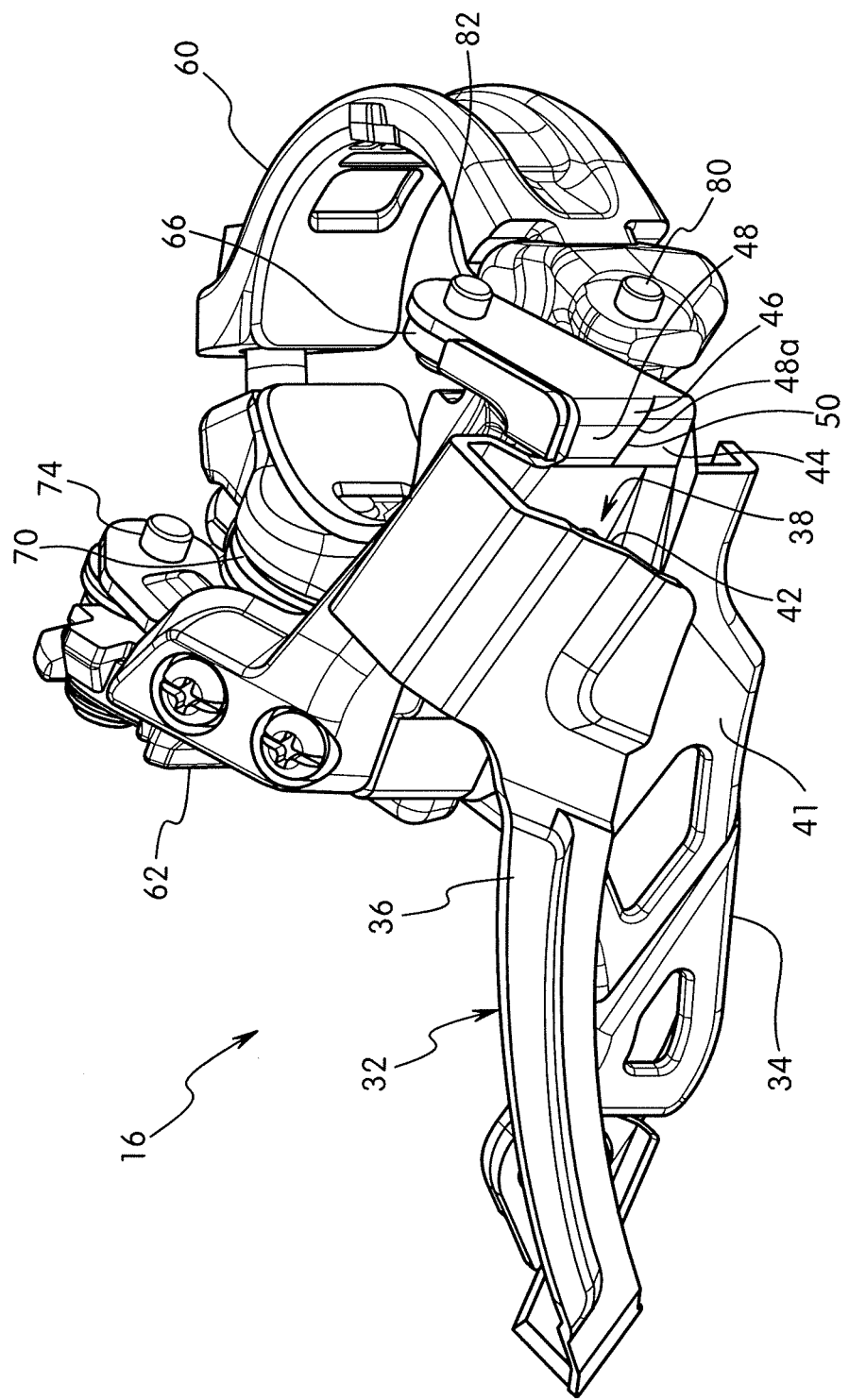
FIG. 15 is a perspective view of the front derailleur of the bicycle structure illustrated in FIGS. 1 to 14 in accordance with the first embodiment.

In this illustrated embodiment, as seen in FIGS. 6 to 9, the first chain engagement surface 41 of the chain guide 32 is provided with a first contact area 44 ("first area") and a second contact area 46 ("second area") for contacting the chain 22 during an upshifting operation of the chain 22 from the middle chain ring 26 onto the largest chain ring 24 of the front crankset 14. The first contact area 44 engages the chain 22 during a usual chain shifting operation that moves the chain 22 onto the largest chain ring 24 as seen in FIGS. 6 to 11. The second contact area 46 engages the chain 22 during an unusual (abnormal or unsuccessful) chain shifting operation that moves the chain 22 onto the largest chain ring 24 as seen in FIGS. 12 to 14. Thus, the term "unusual chain shifting operation" refers to a shifting operation in which the chain 22 gets caught on a tip of one of the teeth 24*a* of the largest chain ring 24 during a shifting operation from a smaller sprocket. On the other hand, the term "usual chain shifting operation" refers to a shifting operation in which the chain 22 does not gets caught on a tip of one of the teeth 24*a* of the largest chain ring 24 during a shifting operation from a smaller sprocket.

Referring to FIGS. 3 to 5, the second contact area 46 includes a protruding part 48. A transition surface 50 extends between the first contact area 44 and the protruding part 48. The protruding part 48 is configured and arranged to aid in an upshifting operation of the chain 22 from the middle chain ring 26 onto the largest chain ring 24 of the front crankset 14 when the chain 22 gets caught on a tip of one of the teeth 24*a* of the largest chain ring 24 during an upshifting operation. The protruding part 48 is disposed at a front edge of the chain guide 34 that forms a chain exit of the chain guide slot 34. Also the protruding part 48 is located above the chain 22 at the area where the teeth 24*a* of the largest chain ring 24 enter into link openings of the chain 22 just prior to the teeth 24*a* or teeth bottoms 24*b* contacting a roller of the chain 22 when the chain 22 is in a fully engaged (non-shifting) position with the teeth 24*a* of the largest chain ring 24.

The protruding part 48 is disposed so that the chain 22 does not contact the protruding part 48 unless the chain 22 gets caught on a tip of one of the teeth 24*a* of the largest chain ring 24 during an upshifting operation. In other words, during a usual (normal or successful) chain shifting operation, the chain 22 does not contact the protruding part 48, but rather the chain 22 contacts the first contact area 44, or possibly also contacts the transition surface 50, to move the chain 22 onto the largest chain ring 24 during the usual chain shifting operation. The usual (normal or successful) chain shifting operation corresponds to a situation in which the chain 22 engages the teeth 24*a* of the largest chain ring 24 without a link or roller of the chain 22 becoming caught on top of a tip of one of the teeth 24*a* of the largest chain ring 24. The protruding part 48 is located a radial outward of the first contact area 44 with respect to the rotational axis A1 of the chain rings 24, 26 and 28.

Referring to FIG. 4, the protruding part 48 has a radial inner edge 48*a* with a forward point P1. The protruding part 48 is located with respect to the largest chain ring 24 such that the protruding part 48 is located away from teeth bottoms 24*b* of the largest chain ring 24 in a radial outside direction of the largest chain ring 24. In particular, at the forward point P1 of the inner edge 48a, the protruding part 48 is located away from the teeth bottom 24b of the largest chain ring 24 at point P1 in the radial outside direction of the largest chain ring 24 by a prescribed distance D2 as measured along a radius R1. The radius R1 extends from the rotational axis A1 of the crankset 14 through the forward point P1 of the inner edge 48a. In this illustrated embodiment, the prescribed distance D2 is 11.2 millimeters. However, the prescribed distance D2 preferably falls in a range from 90% to 190% of the maximum chain height H of the chain 22 (e.g., a range from about eight millimeters to about sixteen millimeters).

With this arrangement, the radially outer edge of the outer link 22a travels along a path that is spaced by a prescribed distance D3 (i.e., between points P2 and P3) away from the teeth bottoms 24b of the largest chain ring 24. In this illustrated embodiment, the prescribed distance D3 is 9.6 millimeters from the teeth bottoms 24b at point P2 to the radially outer edge of the outer link 22a at point P3. Thus, as measured along a radius R1, a clearance of 1.6 millimeters is provided between the radially outer edge of the outer link 22a and the inner edge 48a of the protruding part 48 at the forward point P1. In any event, the protruding part 48 should be located in the second contact area 46 where the chain 22 can be contacted by the protruding part 48 when the chain 22 becomes caught on top of a tip of one of the teeth 24a of the largest chain ring 24 during an upshifting operation. With this dimensional relationship, when the chain 22 gets caught on the on top of a tip of one of the teeth 24a of the largest chain ring 24 during an upshifting operation, the protruding part 48 moves the chain 22 farther from the frame 12 such that the chain 22 becomes fully engaged faster than without the protruding part 48.

Figure 24:
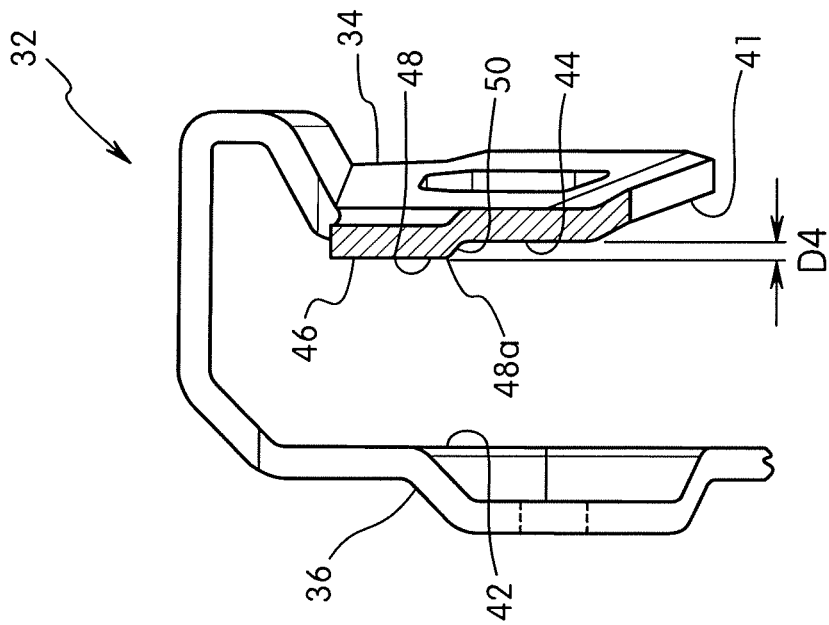
FIG. 24 is an enlargement of the transverse cross sectional view of a portion of the chain cage illustrated in FIG. 23.
Figure 23:
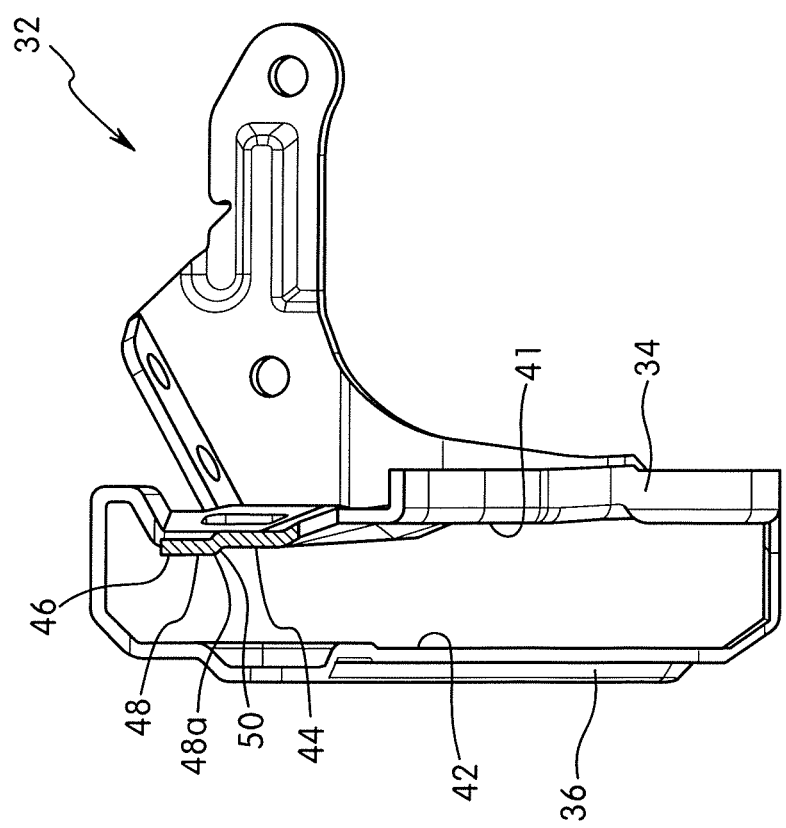
FIG. 23 is a transverse cross sectional view of the chain cage of the front derailleur of the bicycle structure taken along section line 23-23 the chain guide illustrated in FIG. 20.
Figure 25:
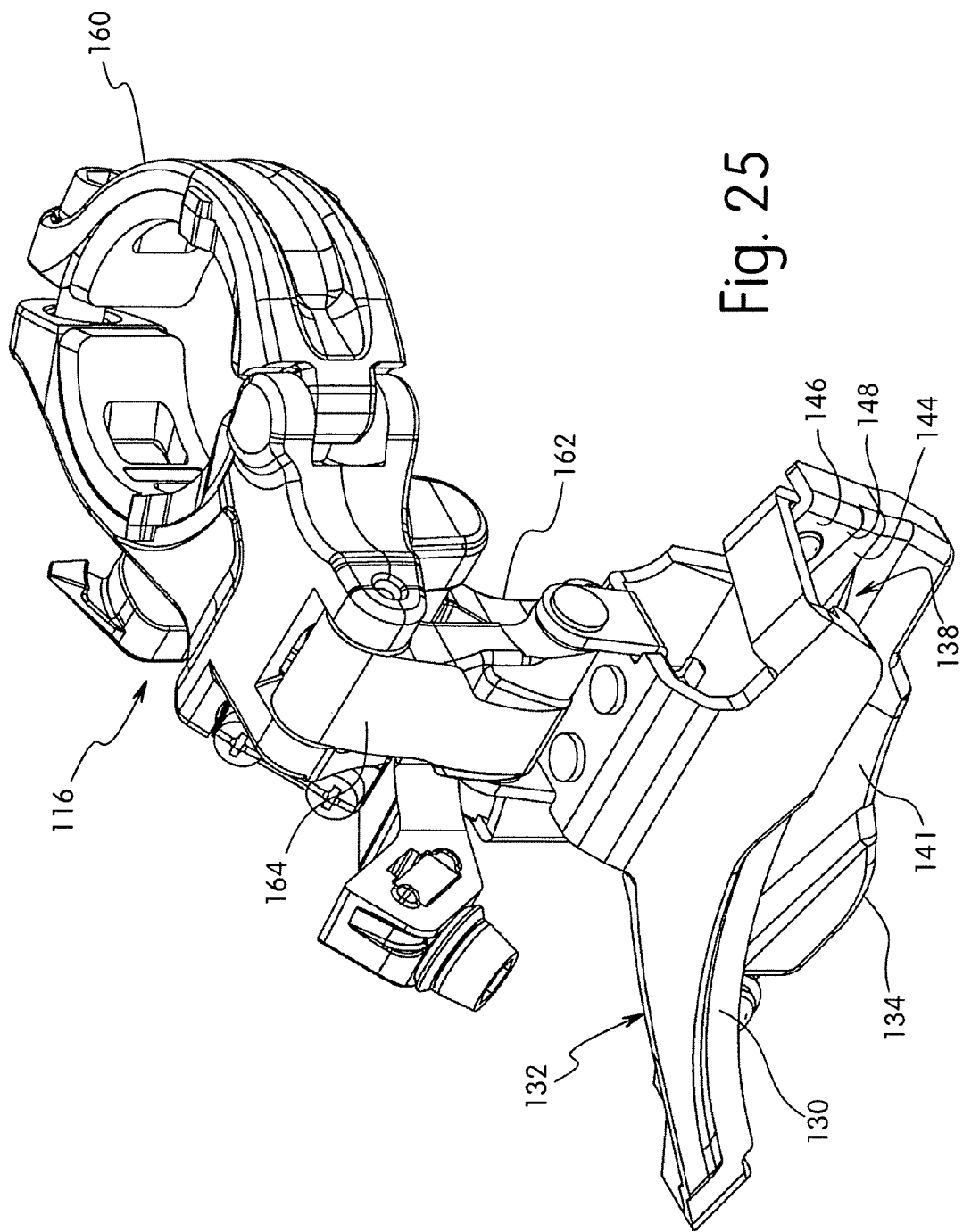
FIG. 25 is a perspective view of a downswing front derailleur that is used with the bicycle structure illustrated in FIGS. 1 to 12 in accordance with a second embodiment.
Figure 27:
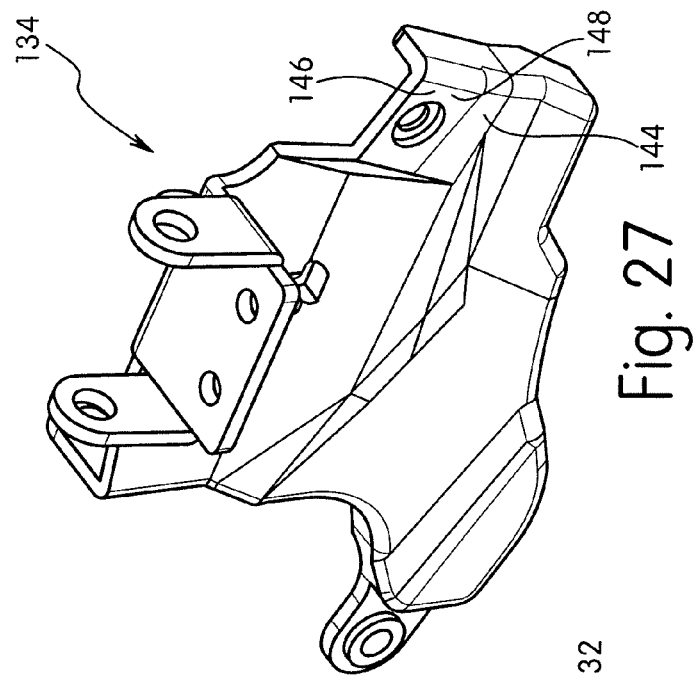
FIG. 27 is a perspective view of the chain cage of the front derailleur of illustrated in FIGS. 25 and 26 in accordance with the second embodiment.
Figure 26:
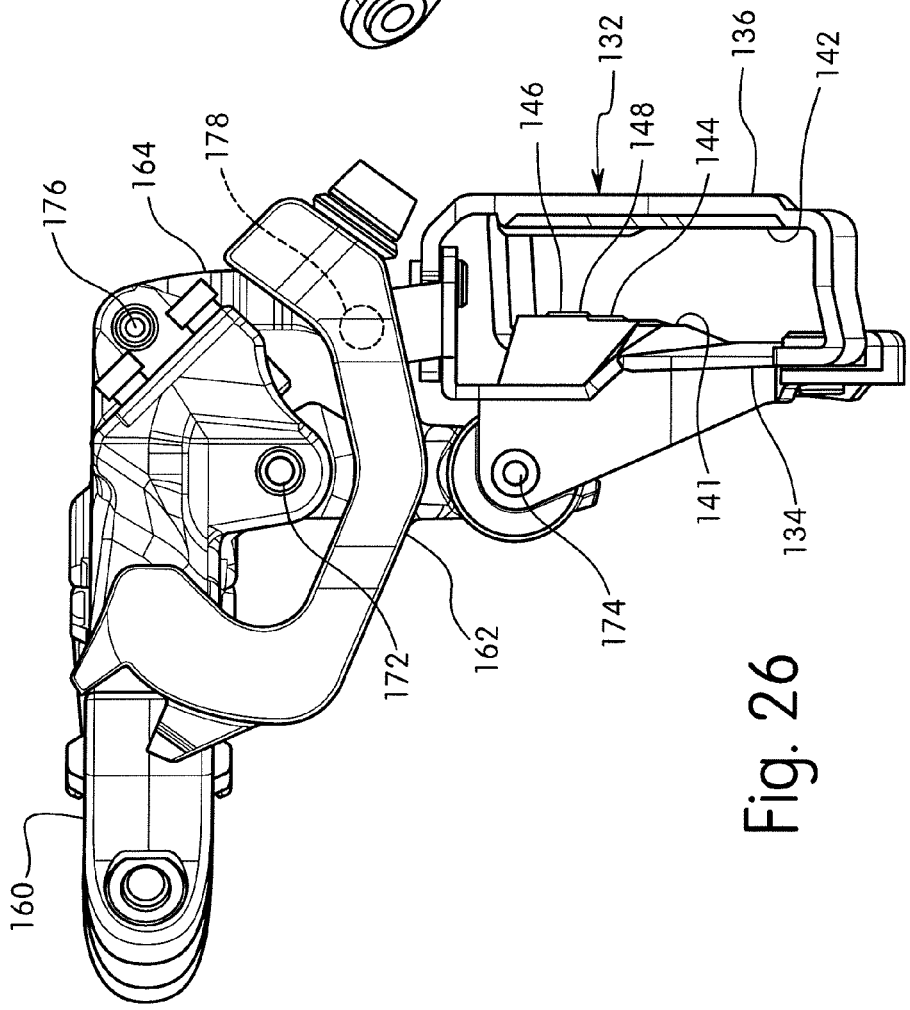
FIG. 26 is a rear elevational view of the front derailleur of the bicycle structure illustrated in FIG. 25 in accordance with the second embodiment.
Figure 28:
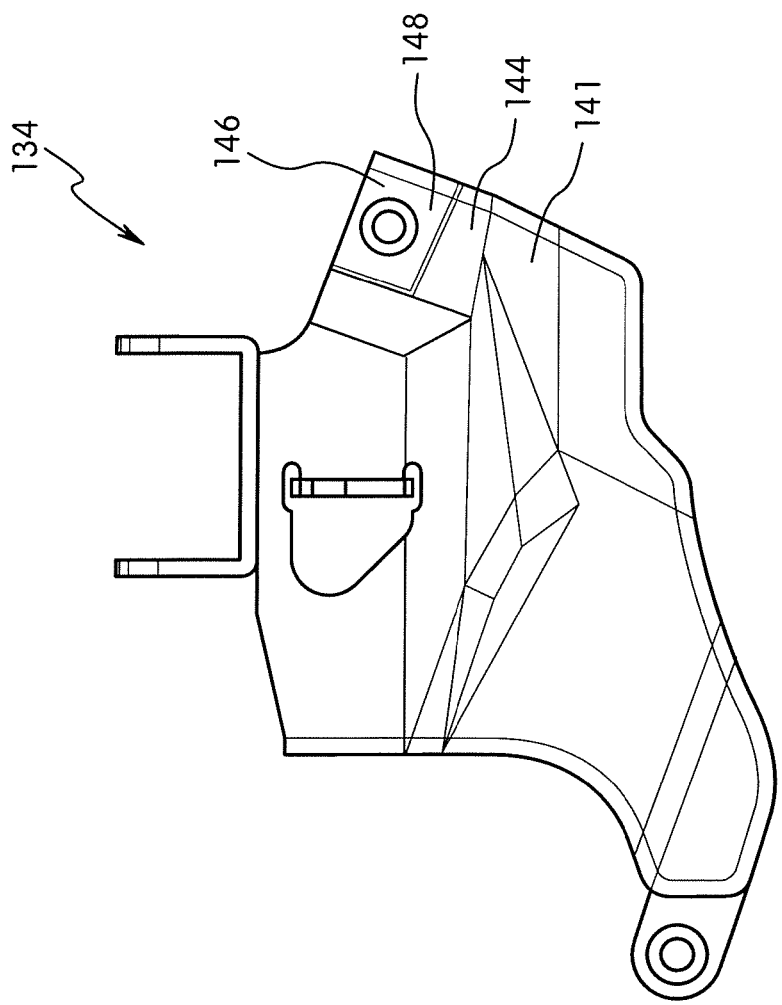
FIG. 28 is an outside elevational view of the chain cage of the front derailleur illustrated in FIGS. 25 to 27 in accordance with the second embodiment.
Figure 29:
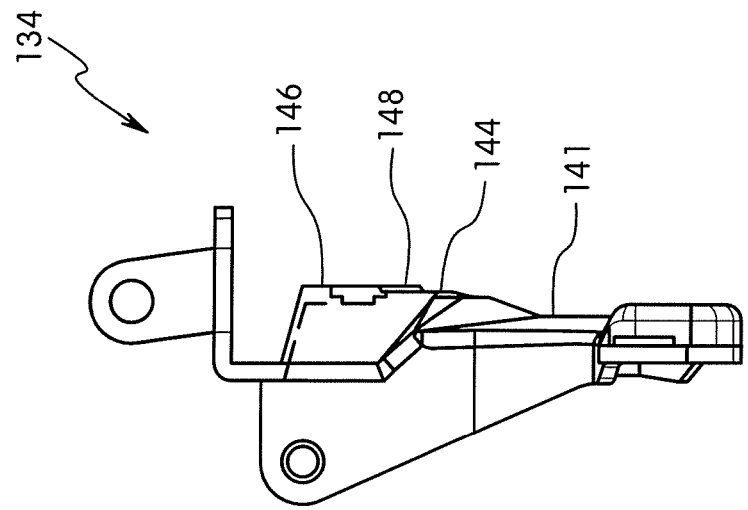
FIG. 29 is a rear elevational view of the chain cage of the front derailleur illustrated in FIGS. 25 to 28 in accordance with the second embodiment.

As seen in FIG. 5, the protruding part 48 protrudes outwardly from the first chain engagement surface 41 into the chain guide slot 38 with respect to the first contact area 44. In the illustrated embodiment, the protruding part 48 protrudes from the first chain engagement surface 41 into the chain guide slot 38 with a prescribed distance D4 in a range of 0.2 millimeters to 2 millimeters (see FIGS. 16 and 24) with respect to the first contact area 44. Thus, the protruding part 48 is offset from the first contact area 44.

As best seen in FIGS. 4, 18 and 19, the inner edge 48a of the protruding part 48 has a prescribed width W extending along a chain travel direction that is parallel to the chain path C. The inner edge 48a is within the prescribed distance D3 away from the teeth bottoms 24b of the largest chain ring 24 in the radial outside direction of the largest chain ring 24 as seen in FIG. 4. Preferably, the prescribed width W of the protruding part 48 has a dimension of at least one millimeter as measured along the chain travel direction that is parallel to the chain path C. In this illustrated embodiment, the prescribed width W is about six millimeters±two millimeters.

Turning now to FIGS. 15 to 24, the front derailleur 16 is illustrated in more detail. In addition to the chain guide 32, the front derailleur 16 further includes a fixed member 60, a cable attachment link 62 and a pair of support links 64 and 66. The front derailleur 16 can be used with a shift cable coming from above the front derailleur 16, or with a shift cable coming from below the front derailleur 16. In other words, a shift cable can be coupled to the cable attachment link 62 of the front derailleur 16 such that its inner wire is either pulled upwardly or pulled downwardly from front derailleur 16 by a shifter. The shifter is conventional and can be any of a variety of types of shifter. Therefore, the precise structure of the shifter will not be discussed or illustrated in herein.

The fixed member 60 constitutes a bicycle mounting portion of the front derailleur 16 for fixing the front derailleur 16 to the seat tube 12a. The links 62, 64 and 66 constitute a linkage support portion that is connected between the fixed member 60 (e.g., the bicycle mounting portion) and the chain guide 32. A torsion spring or biasing member 70 is operatively disposed between the link 62 and the fixed member 60 to bias the chain guide 32 to a retracted position directly vertically above the smallest sprocket 28. In other words, the torsion spring 70 normally biases the chain guide 32 in a transverse direction towards the bicycle frame 12. The link 62 is pivotally connected to the fixed member 60 by a pivot pin 72 and pivotally coupled to the chain guide 32 by a pivot pin 74. The torsion spring 70 has its coiled portion located on the pivot pin 72, with one free end of the torsion spring 70 engaged with the fixed member 60 and the other one free end of the torsion spring 70 engaged with the link 62. The link 64 is pivotally connected to the fixed member 60 by a pivot pin 76 and pivotally coupled to the chain guide 32 by a pivot pin 78. The link 66 is pivotally connected to the fixed member 60 by a pivot pin 80 and pivotally coupled to the chain guide 32 by a pivot pin 82. In this way, the links 62, 64 and 66 (e.g., the linkage support portion) are pivotally connected between the fixed member 60 (e.g., the bicycle mounting portion) and the chain guide 32 such that the front derailleur 16 is an upswing or top swing type front derailleur that can move from a retracted position to a pair of extended positions. Thus, the chain guide 32 is swingably mounted above the fixed member 60 (e.g., the bicycle mounting portion) with the bicycle front derailleur 16 oriented in an installed position.

Second Embodiment

Referring now to FIGS. 25 to 29, a bicycle front derailleur 116 is illustrated in accordance with a second embodiment. The bicycle front derailleur 116 of this second embodiment replaces the bicycle front derailleur 16 of the first embodiment in the bicycle structure 10. The dimensional relationships between the bicycle front derailleur 116, the crankset 14 and the chain 22 are the same as the first embodiment when the bicycle front derailleur 116 is installed on the seat tube 12a. In other words, the bicycle front derailleur 116 includes a chain guide 132 that includes an inner guide plate 134 and an outer guide plate 136 rigidly connected to the inner guide plate 134 in a spaced arrangement to form a chain guide slot 138 therebetween. The chain guide slot 138 is basically defined by a first chain engagement surface 141 and a second chain engagement surface 142. The first chain engagement surface 141 of the chain guide 132 is provided with a first contact area 144 and a second contact area 146 with a protruding part 148 for contacting the chain 22 during an upshifting operation of the chain 22 from the middle chain ring 26 onto the largest chain ring 24 of the front crankset 14. The first contact area 144 engages the chain 22 during a usual chain shifting operation that moves the chain 22 onto the largest chain ring 24. The protruding part 148 of the second contact area 146 engages the chain 22 during an unusual (abnormal or unsuccessful) chain shifting operation that moves the chain 22 onto the largest chain ring 24.

In addition to the chain guide 132, the front derailleur 116 further includes a fixed member 160, a cable attachment (inner) link 162 and a support (outer) link 64. The fixed member 160 constitutes a bicycle mounting portion of the front derailleur 116 for fixing the front derailleur 116 to the seat tube 12a. The links 162 and 164 constitute a linkage support portion that is connected between the fixed member 160 (e.g., the bicycle mounting portion) and the chain guide 132. A torsion spring or biasing member (not shown) is operatively disposed between the link 162 and the fixed member 160 to bias the chain guide 132 to a retracted position directly vertically above the smallest sprocket 28. The link 162 is pivotally connected to the fixed member 160 by a pivot pin 172 and pivotally coupled to the chain guide 132 by a pivot pin 174. The link 164 is pivotally connected to the fixed member 160 by a pivot pin 176 and pivotally coupled to the chain guide 132 by a pivot pin 178. In this way, the links 162 and 164 (e.g., the linkage support portion) are pivotally connected between the fixed member 160 (e.g., the bicycle mounting portion) and the chain guide 132 such that the front derailleur 116 is a downswing or bottom swing type front derailleur that can move from a retracted position to a pair of extended positions. Thus, the chain guide 132 is swingably mounted below the fixed member 160 (e.g., the bicycle mounting portion) with the bicycle front derailleur 116 oriented in an installed position.

Accordingly, the main difference between the bicycle front derailleur 16 of the first embodiment and the bicycle front derailleur 116 of this second embodiment is that the chain guide 132 is swingably mounted below the fixed member 160 in the bicycle front derailleur 116 of this second embodiment while the chain guide 32 is swingably mounted above the fixed member 60 in the bicycle front derailleur 16 of the first embodiment. In view of the similarity between the first and second embodiments, the descriptions of the parts of the second embodiment that are substantially identical to the parts of the first embodiment have been omitted for the sake of brevity. However, it will be apparent to those skilled in the art from this disclosure that the descriptions and illustrations of the first embodiment also apply to this second embodiment, except as discussed and/or illustrated herein.

GENERAL INTERPRETATION OF TERMS

In understanding the scope of the bicycle structure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the bicycle structure, the following directional terms "forward, rearward, above, downward, vertical, horizontal, below and transverse" as well as any other similar directional terms refer to those directions of a bicycle equipped with the bicycle structure. Accordingly, these terms, as utilized to describe the bicycle structure should be interpreted relative to a bicycle equipped with the bicycle structure as used in the normal riding position at flat ground. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Further more, the foregoing descriptions of the embodiments according to the present invention are provided for illustration only, and not for the purpose of limiting the invention as defined by the appended claims and their equivalents.

What is claimed is:

1. A bicycle structure comprising:
a crankset including a plurality of chain rings, with a largest chain ring of the plurality of chain rings having a plurality of teeth with teeth bottoms interposed between adjacent ones of the teeth; and
a front derailleur including a chain guide having a chain guide slot partially defined by a first chain engagement surface with a protruding part that protrudes outwardly from the first chain engagement surface into the chain guide slot, the protruding part being located away from the teeth bottoms of the largest chain ring in a radial outside direction of the largest chain ring by a prescribed distance in a range from eight millimeters to sixteen millimeters,
the protruding part having a radially innermost edge disposed radially outward of a rotational path of a radially outermost surface of the largest chain ring.

2. The bicycle structure according to claim 1, wherein the protruding part is disposed at a front edge of the chain guide that forms a chain exit of the chain guide slot.

3. The bicycle structure according to claim 1, wherein the radially innermost edge has a prescribed width extending along a chain travel direction of the first chain engagement surface, the radially innermost edge being within the prescribed distance away from the teeth bottoms of the largest chain ring in the radial outside direction of the largest chain ring.

4. The bicycle structure according to claim 1, wherein the protruding part has a dimension of at least one millimeter as measured along a chain travel direction of the first chain engagement surface.

5. The bicycle structure according to claim 1, wherein the protruding part protrudes from the first chain engagement surface into the chain guide slot by a prescribed distance in a range of 0.2 millimeters to 2 millimeters.

6. The bicycle structure according to claim 1, wherein the front derailleur includes a bicycle mounting portion and a linkage support portion with the chain guide mounted to the bicycle mounting portion by the linkage support portion such that the chain guide is swingably mounted below the bicycle mounting portion with the bicycle front derailleur oriented in an installed position.

7. The bicycle structure according to claim 1, wherein the front derailleur includes a bicycle mounting portion and a linkage support portion with the chain guide mounted to the bicycle mounting portion by the linkage support portion such that the chain guide is swingably mounted above the bicycle mounting portion with the bicycle front derailleur oriented in an installed position.

8. A bicycle structure comprising:
a chain;
a crankset including a plurality of chain rings, with a largest chain ring of the plurality of chain rings having a plurality of teeth with teeth bottoms interposed between adjacent ones of the teeth; and
a front derailleur including a chain guide having a chain guide slot partially defined by a first chain engagement surface with a protruding part that protrudes outwardly from the first chain engagement surface into the chain guide slot, the protruding part being located away from the teeth bottoms of the largest chain ring in a radial outside direction of the largest chain ring by a prescribed distance in a range from eight millimeters to sixteen millimeters.

the protruding part having a radially innermost edge disposed radially outward of a chain path of the chain while the chain is fully engaged with the largest chain ring.

9. The bicycle structure according to claim 8, wherein the protruding part is disposed at a front edge of the chain guide that forms a chain exit of the chain guide slot.

10. The bicycle structure according to claim 8, wherein the radially innermost edge has a prescribed width extending along a chain travel direction of the first chain engagement surface, the radially innermost edge being within the prescribed distance away from the teeth bottoms of the largest chain ring in the radial outside direction of the largest chain ring.

11. The bicycle structure according to claim 8, wherein the protruding part has a dimension of at least one millimeter as measured along a chain travel direction of the first chain engagement surface.

12. The bicycle structure according to claim 8, wherein the protruding part protrudes from the first chain engagement surface into the chain guide slot by a prescribed distance in a range of 0.2 millimeters to 2 millimeters.

13. The bicycle structure according to claim 8, wherein the front derailleur includes a bicycle mounting portion and a linkage support portion with the chain guide mounted to the bicycle mounting portion by the linkage support portion such that the chain guide is swingably mounted below the bicycle mounting portion with the bicycle front derailleur oriented in an installed position.

14. The bicycle structure according to claim 8, wherein the front derailleur includes a bicycle mounting portion and a linkage support portion with the chain guide mounted to the bicycle mounting portion by the linkage support portion such that the chain guide is swingably mounted above the bicycle mounting portion with the bicycle front derailleur oriented in an installed position.

15. A bicycle structure comprising:
a chain;
a crankset including a plurality of chain rings with a largest chain ring of the plurality of chain rings having a plurality of teeth; and
a front derailleur including a chain guide having a chain guide slot partially defined by a first chain engagement surface with a first area and a second area, the second area being located radially outward of the first area with respect to a center rotational axis of the chain rings, the second area including a protruding part that protrudes outwardly from the first chain engagement surface into the chain guide slot with respect to the first area,
the first area engaging the chain during a usual chain shifting operation in which the chain is moved by the first area to the largest chain ring such that the chain engages the teeth of the largest chain ring without the chain becoming caught on top of a tip of one of the teeth of the largest chain ring, the protruding part being disposed radially outward of a usual chain path of the chain during the usual chain shifting operation with respect to the center rotational axis of the chain rings,
the protruding part of the second area engaging the chain during an unusual chain shifting operation in which the chain engages the teeth of the largest chain ring and the chain becomes caught on top of a tip of one of the teeth of the largest chain ring prior to the protruding part of the second area contacting the chain, the protruding part being disposed at least partially radially aligned with an unusual chain path of the chain during the unusual chain shifting operation, the protruding part being located away from the teeth bottoms of the largest chain ring in a radial outside direction of the largest chain ring by a prescribed distance in a range from eight millimeters to sixteen millimeters.

16. The bicycle structure according to claim 15, wherein the protruding part is disposed at a front edge of the chain guide that forms a chain exit of the chain guide slot.

17. The bicycle structure according to claim 15, wherein the protruding part has an inner edge with a prescribed width extending along a chain travel direction of the first chain engagement surface, the inner edge being within the prescribed distance away from teeth bottoms of the largest chain ring in a radial outside direction of the largest chain ring.

18. The bicycle structure according to claim 15, wherein the protruding part has a dimension of at least one millimeter as measured along a chain travel direction of the first chain engagement surface.

19. The bicycle structure according to claim 15, wherein the protruding part protrudes from the first chain engagement surface into the chain guide slot by a prescribed distance in a range of 0.2 millimeters to 2 millimeters.

20. The bicycle structure according to claim 15, wherein the front derailleur includes a bicycle mounting portion and a linkage support portion with the chain guide mounted to the bicycle mounting portion by the linkage support portion such that the chain guide is swingably mounted below the bicycle mounting portion with the bicycle front derailleur oriented in an installed position.

21. The bicycle structure according to claim 15, wherein the front derailleur includes a bicycle mounting portion and a linkage support portion with the chain guide mounted to the bicycle mounting portion by the linkage support portion such that the chain guide is swingably mounted above the bicycle mounting portion with the bicycle front derailleur oriented in an installed position.

* * * * *